United States Patent
Chen et al.

(10) Patent No.: US 11,531,540 B2
(45) Date of Patent: Dec. 20, 2022

(54) PROCESSING APPARATUS AND PROCESSING METHOD WITH DYNAMICALLY CONFIGURABLE OPERATION BIT WIDTH

(71) Applicant: Cambricon (Xi'an) Semiconductor Co., Ltd., Xi'an (CN)

(72) Inventors: Tianshi Chen, Pudong New Area (CN); Jie Wei, Pudong New Area (CN); Tian Zhi, Pudong New Area (CN); Zai Wang, Pudong New Area (CN); Shaoli Liu, Pudong New Area (CN); Yuzhe Luo, Pudong New Area (CN); Qi Guo, Pudong New Area (CN); Wei Li, Pudong New Area (CN); Shengyuan Zhou, Pudong New Area (CN); Zidong Du, Pudong New Area (CN)

(73) Assignee: CAMBRICON (XI'AN) SEMICONDUCTOR CO., LTD., Xi'an (CN)

( * ) Notice: Subject to any disclaimer, the term of this patent is extended or adjusted under 35 U.S.C. 154(b) by 421 days.

(21) Appl. No.: 16/476,262

(22) PCT Filed: Apr. 17, 2018

(86) PCT No.: PCT/CN2018/083415
§ 371 (c)(1),
(2) Date: Jul. 5, 2019

(87) PCT Pub. No.: WO2018/192500
PCT Pub. Date: Oct. 25, 2018

(65) Prior Publication Data
US 2020/0050918 A1    Feb. 13, 2020

(30) Foreign Application Priority Data

Apr. 19, 2017  (CN) .......................... 201710256445.X
Apr. 21, 2017  (CN) .......................... 201710264686.9
(Continued)

(51) Int. Cl.
*G06F 7/46*     (2006.01)
*G06N 3/04*     (2006.01)
(Continued)

(52) U.S. Cl.
CPC ................. *G06F 9/30* (2013.01); *G06F 7/46* (2013.01); *G06F 9/30007* (2013.01); *G06N 3/04* (2013.01); *G06N 3/08* (2013.01)

(58) Field of Classification Search
CPC ................................... G06N 3/04; G06N 3/08
See application file for complete search history.

(56) References Cited

U.S. PATENT DOCUMENTS 9,189,200 B1    11/2015   Langhammer
2005/0257026 A1  11/2005   Meeker
(Continued)

FOREIGN PATENT DOCUMENTS

CN   101038681 A   9/2007
CN   101527010 A   9/2009
(Continued)

OTHER PUBLICATIONS

EP 19 214 320.4, Communication pursuant to Article 94(3), 6 pages.
(Continued)

*Primary Examiner* — Michael D. Yaary
(74) *Attorney, Agent, or Firm* — Getech Law LLC; Jun Ye

(57) ABSTRACT

A processing device with dynamically configurable operation bit width, characterized by comprising: a memory for
(Continued)

storing data, the data comprising data to be operated, intermediate operation result, final operation result, and data to be buffered in a neural network; a data width adjustment circuit for adjusting the width of the data to be operated, the intermediate operation result, the final operation result, and/or the data to be buffered; an operation circuit for operating the data to be operated, including performing operation on data to be operated of different bit widths by using an adder circuit and a multiplier; and a control circuit for controlling the memory, the data width adjustment circuit and the operation circuit. The device of the present disclosure can have the advantages of strong flexibility, high configurability, fast operation speed, low power consumption or the like.

30 Claims, 32 Drawing Sheets

(30) Foreign Application Priority Data

Apr. 21, 2017 (CN) .......................... 201710269049.0
Apr. 21, 2017 (CN) .......................... 201710269106.5

(51) Int. Cl.
*G06N 3/08* (2006.01)
*G06F 9/30* (2018.01)

(56) References Cited

U.S. PATENT DOCUMENTS

| | | | |
|---|---|---|---|
| 2009/0271465 | A1 | 10/2009 | Pistorius et al. |
| 2011/0055308 | A1 | 3/2011 | Mantor et al. |
| 2014/0164457 | A1 | 6/2014 | Chaudhuri |
| 2014/0208081 | A1 | 7/2014 | Yap |
| 2015/0046671 | A1 | 2/2015 | Ould-Ahmed-Vall |
| 2016/0328647 | A1 | 11/2016 | Lin et al. |
| 2017/0102920 | A1 | 4/2017 | Henry et al. |
| 2018/0129935 | A1* | 5/2018 | Kim ........................ G06N 3/082 |

FOREIGN PATENT DOCUMENTS

| | | | |
|---|---|---|---|
| CN | 101571796 | A | 11/2009 |
| CN | 101685388 | A | 3/2010 |
| CN | 103699360 | A | 4/2014 |
| CN | 104011657 | A | 8/2014 |
| CN | 104699458 | A | 6/2015 |
| CN | 105005911 | A | 10/2015 |
| CN | 105207794 | A | 12/2015 |
| CN | 105359129 | A | 2/2016 |
| CN | 105426160 | A | 3/2016 |
| CN | 105453071 | A | 3/2016 |
| CN | 105512723 | A | 4/2016 |
| CN | 106066783 | A | 11/2016 |
| CN | 106447034 | A | 2/2017 |
| CN | 106528047 | A | 3/2017 |
| EP | 0428942 | A2 | 5/1991 |
| EP | 0428942 | A3 | 5/1991 |

OTHER PUBLICATIONS

PCT/CN2018/083415—International Search Report, dated Jul. 20, 2018, 10 pages. (no English translation).
EP 19214320.4, European Search Report dated Mar. 24, 2020, 8 pages.
CN 201710264686.9, Official Action dated Apr. 17, 2020, 11 pages. (No English Translation).
CN 201710269106.5, Official Action dated Mar. 26, 2020, 11 pages. (No English Translation).
CN 201811097653.0, Official Action dated Apr. 30, 2020, 8 pages, (No English Translation).
Article 296-302 "Binary Number Multiplier" 2020, 19 pages (11 pages of Translation, 8 pages of Article).
CN 201710264686.9—Second Office Action, dated Dec. 23, 2020, 10 pages. (no English translation).
CN 201710264686.9—Third Office Action, dated Mar. 18, 2021, 12 pages. (no English translation).
Xu Jianbang, et.al, "National Defense Industry Press", DSP Algorithm and Architecture Realization Technology, Jan. 31, 2010, 4 pages. (no English translation).
CN 201710256445.X—First Office Action, dated Sep. 25, 2020, 10 pages (no English translation).
Tao Wang, et al., "The Study and Realization of Instruction Folding in Java Processor", Computer Research and Development, vol. 37 No. 1, Jan. 31, 2000, 5 pages. (with English abstract).
Yigang Zhang, "Harbin Institute of Technology Press" MCS-51 Singer Chip Microcomputer Application Design, 2nd Edition, Dec. 31, 1997, 3 pages. (no English translation).
CN 201710269049.0—First Office Action, dated May 15, 2020, 7 pages. (no English translation).
CN 201710269106.5—Second Office Action, dated Nov. 3, 2020, 5 pages. (no English translation).
CN 201711468817.1—First Office Action, dated Dec. 8, 2020, 8 pages. (no English translation).
CN 201811097569.9—First Office Action, dated Aug. 3, 2020, 11 pages. (no English translation).
EP 18788355.8—Extended European Search Report, dated Jan. 22, 2021, 8 pages.
EP 18788355.8—Response to the Communication under Rules 161 and 162 EPC dated Nov. 26, 2019, filed Feb. 4, 2020, 18 pages.
Taesik Na, et al., "Speeding Up Convolutional Neural Network Training with Dynamic precision Scaling and Flexible Mlultiplier-Accumulator", ISLPED, Aug. 2016, 6 pages.
KR 10-2019-7025307—Response to Office Action, filed Feb. 9, 2021, 22 pages. (no English translation).
KR 10-2019-7025307—Office Action, dated Dec. 28, 2020, 3 pages. (no English translation).
JP 2019-228383—First Office Action, dated 2019, 5 pages. (no English translation).
EP 19214371.7—Extended European Search Report, dated Jan. 25, 2021, 9 pages.
JP 2019-549467 Notice of Reason for Refusal, mailed Jan. 19, 2021, 14 pages, (with English translation).

* cited by examiner

Basic instruction format

| Opcode | Source operand reference 1 | Source operand reference 2 | Target address |
|---|---|---|---|

Fig. 30A

Addition instruction (register addressing)

| 0001 | 01 | Register number of source operand 1 | Register number of source operand 2 | Target address |
|---|---|---|---|---|

Opcode
    Addressing mode flag

Fig. 30B

Addition instruction (register indirect addressing)

| 0001 | 10 | The number of register where the address of source operand 1 exists | The number of register where the address of source operand 2 exists | Target address |
|---|---|---|---|---|

Opcode
    Addressing mode flag

Fig. 30C

Addition instruction (immediate operand)

| 0001 | 00 | 0 | Source operand 1 | Source operand 2 | Target address |
|---|---|---|---|---|---|

Opcode
    Addressing mode flag    Data type flag

Fig. 30D

Addition instruction (RAM addressing)

| 0001 | 11 | Address of RAM unit where source operand 1 exists | Address of RAM unit where source operand 2 exists | Target address |
|---|---|---|---|---|

Opcode
    Addressing mode flag

Fig. 30E

PROCESSING APPARATUS AND PROCESSING METHOD WITH DYNAMICALLY CONFIGURABLE OPERATION BIT WIDTH

TECHNICAL FIELD

The present disclosure relates to the field of computer, and further relates to a processing device and a processing method in the field of artificial intelligence.

BACKGROUND

With the advent of the era of big data, neural network algorithms have become a research hotspot in the field of artificial intelligence in recent years, and have been widely used in pattern recognition, image analysis, and intelligent robots.

Deep learning is a method in machine learning based on learning data representations. Observation values (e.g., an image) can be represented in a variety of ways, such as a vector of the intensity value of each pixel, or more abstractly represented as a series of edges, regions of particular shapes, and the like. Using certain representation methods makes it easier to learn humans as the objects from the instances (e.g., face recognition or facial expression recognition).

So far, several deep learning architectures, such as deep neural network, convolutional neural network and deep belief network and recurrent neural network, have been applied in the fields of computer vision, speech recognition, natural language processing, audio recognition and bioinformatics, and have achieved excellent results. In addition, deep learning has become a term to some extent, or a rebranding of neural network.

As deep learning (neural network) becomes popular, neural network accelerators have emerged. By specialized memory and operation module design, the neural network accelerator can obtain dozens of times or even hundreds of times of the speedup ratio in the deep learning operation than the general-purpose processor, and the area of the accelerator is smaller, and the power consumption is lower.

SUMMARY

The present disclosure provides a processing device with dynamically configurable operation bit width, comprising:
a memory for storing data, the data comprising data to be operated, intermediate operation result, final operation result, and data to be buffered in a neural network;
a data width adjustment circuit, configured to adjust the width of the data to be operated, the intermediate operation result, the final operation result, and/or the data to be buffered;
an operation circuit for operating the data to be operated in the neural network; and
a control circuit for controlling the memory, the data width adjustment circuit and the operation circuit.

The present disclosure also provides a method of using a processing device with dynamically configurable operation bit width, comprising the following steps:
generating, by using a control unit, a control instruction, and transmitting it to a memory, a data width adjustment circuit and an operation circuit;
inputting, by using the memory, data to be operated in a neural network into the operation circuit according to the received control instruction;
adjusting, by using the data width adjustment circuit, the width of the data to be operated in the neural network according to the received control instruction;
selecting, by using the operation circuit, a multiplier circuit and an adder circuit of a corresponding type in a first operation module according to the received control instruction;
performing, by using the operation circuit, operation of the data to be operated in the neural network with different operation bit widths according to the input data to be operated and parameters of the neural network as well as the control instruction.

The present disclosure also provides a processing device comprising: a memory for storing data, the data comprising data to be operated in a neural network; an operation circuit for operating the data to be operated in the neural network, including performing operation on the data to be operated in the neural network with different operation bit widths by using an adder circuit and a multiplier circuit; and a control circuit for controlling the memory and the operation circuit, including determining a type of the multiplier circuit and the adder circuit of the operation circuit according to the data to be operated so as to perform the operation.

The present disclosure also provides a method of using the aforesaid processing device, comprising the following steps: the control circuit generates a control instruction and transmits it to the memory and the operation circuit; the memory inputs data to be operated in a neural network into the operation circuit according to the received control instruction; the operation circuit selects a multiplier circuit and an adder circuit of a corresponding type in a first operation module according to the received control instruction; the operation circuit performs operation on the data to be operated in the neural network with different operation bit widths according to the input data to be operated and parameters of the neural network as well as the control instruction, and sends the operation result back to the memory.

The present disclosure also provides an operation device, comprising: an input module, configured to acquire input data, wherein the input data includes data to be processed, a network structure and weight data, or the input data includes data to be processed and/or offline model data; a model generation module, configured to construct an offline model according to the input network structure and weight data; a neural network operation module, configured to generate an operation instruction based on the offline model and buffer it, and compute the data to be processed based on the operation instruction to obtain an operation result; an output module, configured to output the operation result; a control module, configured to detect the type of the input data and control the input module, the model generation module, and the neural network operation module to perform operation.

The present disclosure also provides an operation method using the aforesaid operation device, comprising steps of:
acquiring input data;
acquiring an offline model, or determining an offline model based on the input data, and determining an operation instruction based on the offline model for subsequent operation calls;
calling the operation instruction and performing operation on the processing data to obtain an operation result for output.

The present disclosure also provides a device supporting a composite scalar instruction, comprising a controller module, a storage module, and an operator module; wherein, the storage module is configured to store the composite scalar instruction and data, the data has more than one type, and different types of data are stored in different addresses in the storage module; the controller module is configured to read the composite scalar instruction from the storage module and decode it into a control signal; the operator module is configured to receive the control signal, read data from the storage module, determine data type according to the address of the read data, and compute the data.

The present disclosure also provides a processor for executing a composite scalar instruction, wherein the composite scalar instruction includes an opcode field, an operand address field, and a destination address field; and the opcode stored in the opcode field is used to distinguish different types of operation, the operand address field is used to distinguish types of the operand, and the destination address field is an address where the operation result is stored.

The present disclosure also provides a method for executing a composite scalar instruction, comprising steps of: storing different types of data in different addresses; decoding the composite scalar instruction into a control signal; reading operation data according to the control signal, determining a type of the operation data according to the address of the read operation data, and performing operation on the operation data; storing an operation result in an address of a corresponding type.

The present disclosure also provides a counting device, comprising: a register unit, a counting unit and a storage unit, wherein the register unit is configured to store an address where input data to be counted is stored in the storage unit; the counting unit is connected to the register unit, and is configured to acquire a counting instruction, read a storage address of the input data in the register unit according to the counting instruction, acquire corresponding input data to be counted in the storage unit, and perform statistical counting on the number of elements in the input data that satisfy a given condition, to obtain a counting result; the storage unit is connected to the counting unit and is configured to store the input data to be counted and store the counting result.

The present disclosure also provides a counting method of the aforesaid counting device, comprising the following steps: the counting unit acquires a counting instruction, acquires corresponding input data to be counted in the storage unit according to the address of the input data read from the register unit according to the counting instruction, and performs statistical counting on the number of elements in the input data that satisfy a given condition, to obtain a counting result; the statistical counting result is transmitted to the storage unit.

BRIEF DESCRIPTION OF THE DRAWINGS

In order to more clearly illustrate technical solutions of the embodiments of the present disclosure, the drawings to be used in the description of the embodiments will be briefly described below. Apparently, the drawings in the following description are only some embodiments of the present disclosure, and persons of ordinary skill in the art will be able to obtain other drawings from these drawings without paying inventive effort.

FIG. 30A is an exemplary diagram of a composite scalar instruction provided in an embodiment of the present disclosure.

FIG. 30B is an exemplary diagram of a composite scalar instruction when register addressing is used, provided in an embodiment of the present disclosure.

FIG. 30C is an exemplary diagram of a composite scalar instruction when register indirect addressing is used, provided in an embodiment of the present disclosure.

FIG. 30D is an exemplary diagram of a composite scalar instruction when immediate operand addressing is used, provided in an embodiment of the present disclosure.

FIG. 30E is an exemplary diagram of a composite scalar instruction when RAM addressing is used, provided in an embodiment of the present disclosure.

DETAILED DESCRIPTION

The technical solutions in the embodiments of the present disclosure are clearly and completely described below with reference to the drawings in the embodiments of the present disclosure. Apparently, the described embodiments are only a part of the embodiments of the present disclosure, rather than all of the embodiments. All other embodiments obtained by a person of ordinary skill in the art based on the embodiments of the present disclosure without creative efforts are within the scope of the present disclosure.

The "memory" described in the present disclosure may be integrated within a processing device with dynamically configurable operation bit width, or may be a separate device, as an external memory for data transmission with a processing device with dynamically configurable operation bit width.

Figure 1:
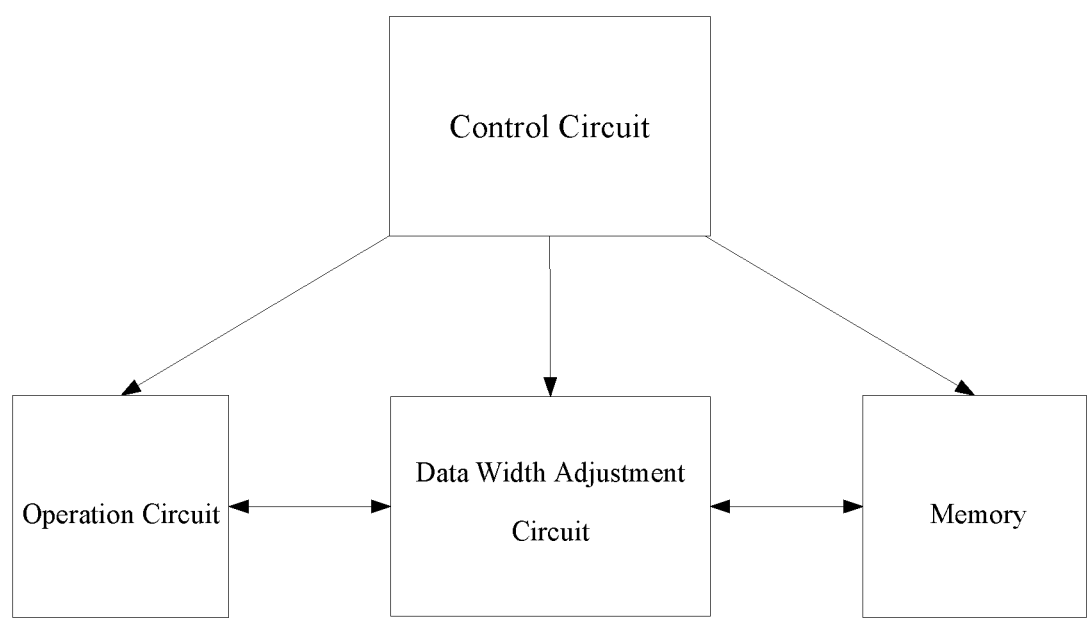
FIG. 1 is a structural schematic diagram of a processing device with dynamically configurable operation bit width provided in an embodiment of the present disclosure.

FIG. 1 is a schematic diagram of a processing device with dynamically configurable operation bit width provided in an embodiment of the present disclosure. As shown in FIG. 1, the device comprises a control circuit, a data width adjustment circuit, an operation circuit and a memory.

The control circuit is configured to send a control signal to the data width adjustment circuit, the operation circuit, and the memory so as to control the operation of the three and coordinate data transmission between the three. The memory is configured to store related data which may include input data (including data to be operated and control instructions), intermediate operation results, final operation results, neurons, synaptics, data to be buffered, etc. According to various needs, specific data content stored, the manner of organizing the storage, and the manner of accessing and calling may be planned differently. As shown by FIG. 1, the data width adjustment circuit is configured to adjust the width of the data. This process may take place as follows: the data read from the memory is transmitted to the operation circuit after undergoing bit width adjustment by the data width adjustment circuit, the operation circuit transmits an operation result back to the memory after the data undergoes bit width adjustment by the data width adjustment circuit, the data from the memory is subject to bit width adjustment by the data width adjustment circuit and is transmitted back to the memory, and the like. The specific operations are controlled by a control signal of the control circuit. The specific operations include increasing or decreasing or maintaining the data bit width without loss of precision; increasing or decreasing or maintaining the data bit width with an acceptable degree of precision loss; increasing or decreasing or maintaining the data bit width according to some specified transformation or operation requirement (such as specifying a "bitwise AND" operation). The operation circuit may comprise at least one addition unit and at least one multiplier unit for operations of the data. The at least one addition unit includes an adder, an addition tree, and/or a serial addition tree; the at least one multiplier unit includes a basic multiplier, a sparse multiplier, and/or a fused vector multiplier. The operation circuit may further include a comparator and/or an ALU, etc., wherein the multiplier unit and the addition unit can perform operations on data of different calculation bit widths and can perform operations between operation data of different bit widths according to different needs. The multiplier may be a serial operator that implements the multiplication operation by a bit serial method. It should be noted that the operation circuit may transmit data directly with the memory without passing through the data width adjustment circuit.

Figure 2:
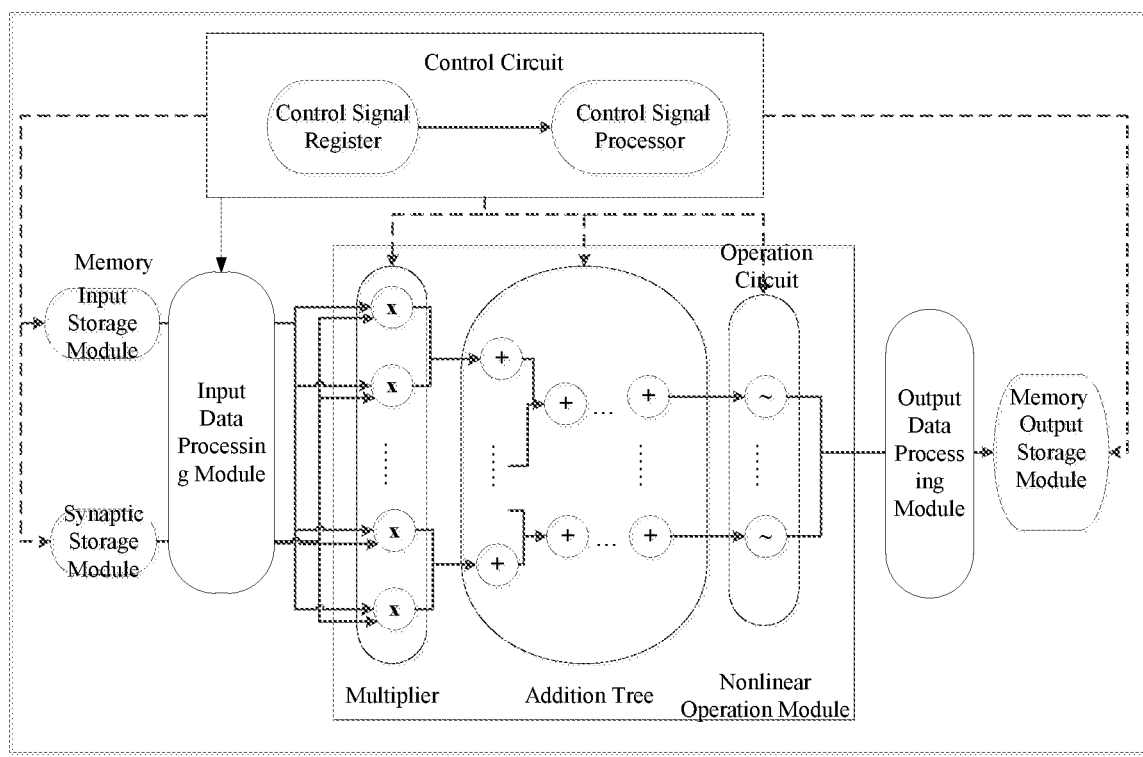
FIG. 2 is a structural schematic diagram of a processing device with dynamically configurable operation bit width provided in another embodiment of the present disclosure.

FIG. 2 is a schematic diagram of a processing device with dynamically configurable operation bit width provided in an embodiment of the present disclosure. As shown by FIG. 2, the structure of this device is as follows. A control circuit is connected to each module or sub-module of a memory and to an operation circuit, and the control circuit comprises at least one control signal register and at least one control processor, and the control signal register is configured to store control signals, and optionally, the control signal register is FIFO. The control processor is configured to take out a control signal to be executed, and control and coordinate the memory, a data width adjustment circuit, and an operation circuit after analyzing the control logic. The memory comprises an input storage module, an output storage module, and a synaptic storage module, wherein the output storage module can be used to store intermediate operation results and final operation results. The data width adjustment circuit may be divided into an input data processing module and an output data processing module. The input data processing module is configured to adjust the data width of the data in the input storage module and/or the synaptic storage module, and the input data processing module can be provided after the input storage module. The output data processing module is configured to perform width adjustment on the data operated by the operation circuit and then store the data in the output storage module. The operation circuit is mainly used for accelerating the convolution operation of the convolutional layer and the fully connected layer, and the operation of taking the average or maximum value of the pooling layer. Optionally, the operation circuit may include a multiplier module, an addition tree module, and a nonlinear operation module (e.g., a module that performs a sigmoid function operation). The multiplier module, the addition tree module, and the nonlinear operation module may be executed in parallel in a pipelined manner. The device may accelerate the operation process of a convolutional neural network, reduce the on-chip and off-chip data exchange, and save storage space.

Figure 3:
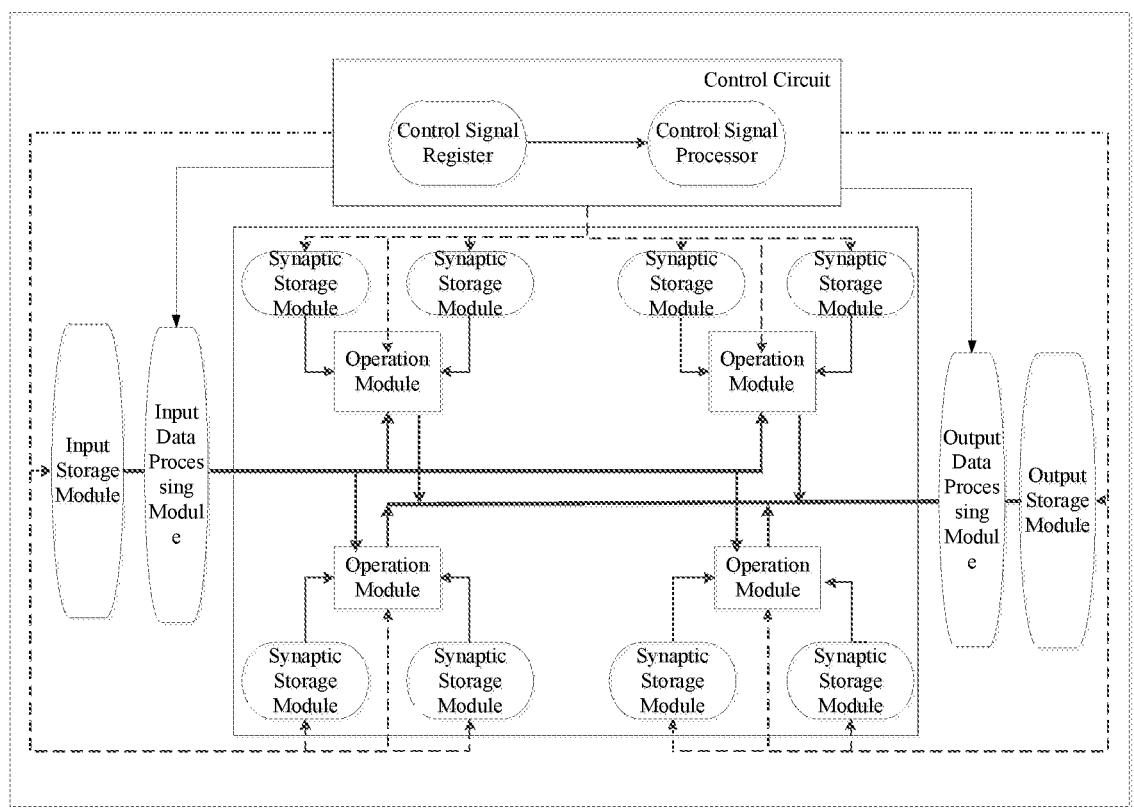
FIG. 3 is a structural schematic diagram of a processing device with dynamically configurable operation bit width provided in a further embodiment of the present disclosure.

FIG. 3 is a schematic diagram of a processing device according to another embodiment of the present disclosure. As shown by FIG. 3, the structure of this device is as follows. A control circuit is connected to each module of a memory and to an operation circuit, and the control circuit comprises a control signal register and a control processor, wherein the control signal register is configured to store control signals, and the control processor is configured to take out the control signal to be executed, and control and coordinate the memory and an operation circuit after analyzing the control logic. Optionally, the control signal register is FIFO. The memory comprises an input storage module, an output storage module, and a synaptic storage module. In the present processing device, the synaptic storage module includes a plurality of synaptic storage sub-modules, and the operation circuit includes a plurality of operation modules, and the synaptic storage sub-modules are correspondingly connected to the operation modules, respectively. One synaptic storage sub-module may be correspondingly connected to one operation module, or a plurality of synaptic storage sub-modules may be correspondingly connected to one operation module. The data width adjustment circuit may be divided into an input data processing module and an output data processing module. The input data processing module is configured to adjust the data width of the data in the input storage module and/or the synaptic storage module, and the input data processing module can be provided after the input storage module. The output data processing module is configured to perform width adjustment on the data operated by the operation circuit and then store the data in the output storage module. At each operation, after passing through the input data processing module, the input storage module transmits input data to all the operation modules, and the synaptic storage modules transmit synapse data to the corresponding operation modules. After the operation module performs the operation, the output data processing module writes the result in the output storage module. In this way, in large-scale operation with many parameters, the operation efficiency can be significantly improved. The device can effectively accelerate the operation process of the convolutional neural network, and especially applicable to large network scale with many parameters.

Figure 4:
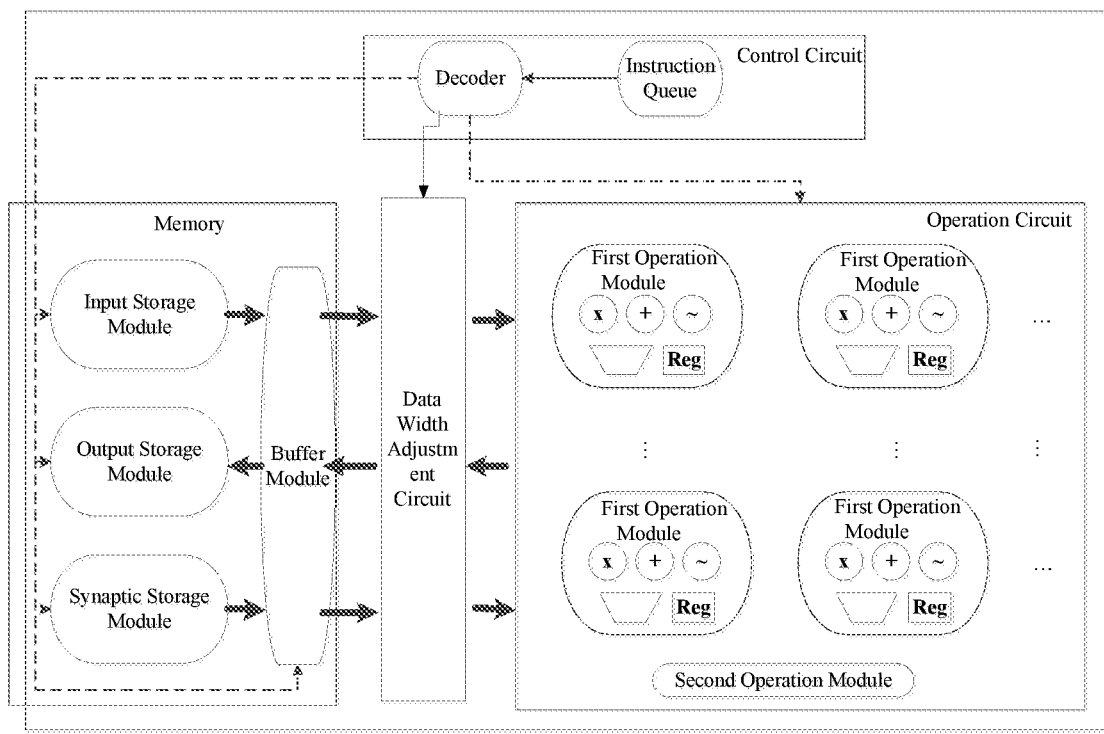
FIG. 4 is a structural schematic diagram of a processing device with dynamically configurable operation bit width provided in yet another embodiment of the present disclosure.

FIG. 4 is a schematic diagram of a processing device according to a further embodiment of the present disclosure. As shown by FIG. 4, the structure of this device is as follows. A control circuit is connected to each module of a memory and to an operation circuit and a data width adjustment circuit. The control circuit comprises an instruction queue and a decoder, each time a new instruction is executed, a new instruction being taken from the instruction queue and sent to the decoder; decoded by the decoder, the control information is sent to each module of the memory, and to the operation circuit and the data width adjustment circuit. The memory comprises an input storage module, an output storage module, a synaptic storage module, and a buffer module, wherein the output storage module can be used to store intermediate operation results and final operation results. Each time the input storage module and the synaptic storage module transmit data to the operation circuit, the data is first transmitted to the buffer module. The buffered data is then read to the data width adjustment circuit. If the control instruction requires processing of the data, the data width adjustment circuit performs corresponding processing, for example, expanding the bit width of the data without loss of precision, reducing the bit width of the data by forcibly removing the lowest bit of the data, or the like. After undergoing the processing by the data width adjustment circuit, the data is then transmitted to a corresponding operation module. If the control instruction does not require processing of the data, the data can be transmitted to a corresponding operation module via the data width adjustment circuit directly. Similarly, when the operation module finishes the operation, the result is first sent to the data width adjustment circuit to accomplish data processing or not to accomplish data processing according to the control instruction, and then transmitted to the buffer module, followed by being written into the output storage module from the buffer module. The operation circuit comprises a plurality of operation modules, including a first operation module and a second operation module. The operation modules may perform related operations in parallel, and may also transmit data to each other, thereby reducing the reuse distance of the localized data and further improving the operation speed. The first operation module is mainly used to accelerate linear operations of the same or different calculation bit widths in the neural network algorithm, including: inter-matrix multiplication, addition, multiplication and addition; matrix and vector; matrix and constant; inter-vector; vector and constant; constant and constant. The first operation module may also be used for comparison operation, selection of maximum/minimum values, etc. Preferred operations include dot product, matrix multiplication, and/or matrix addition. The second operation module is configured to perform operations unfinished in the first operation module, including nonlinear operations, division operations, separate addition operations, or separate multiplication operations. The advantage of such is that the bit width of data can be dynamically adjusted in the operation process according to the control instruction, so that the hardware utilization of the operation circuit and the memory can be further improved.

Figure 5:
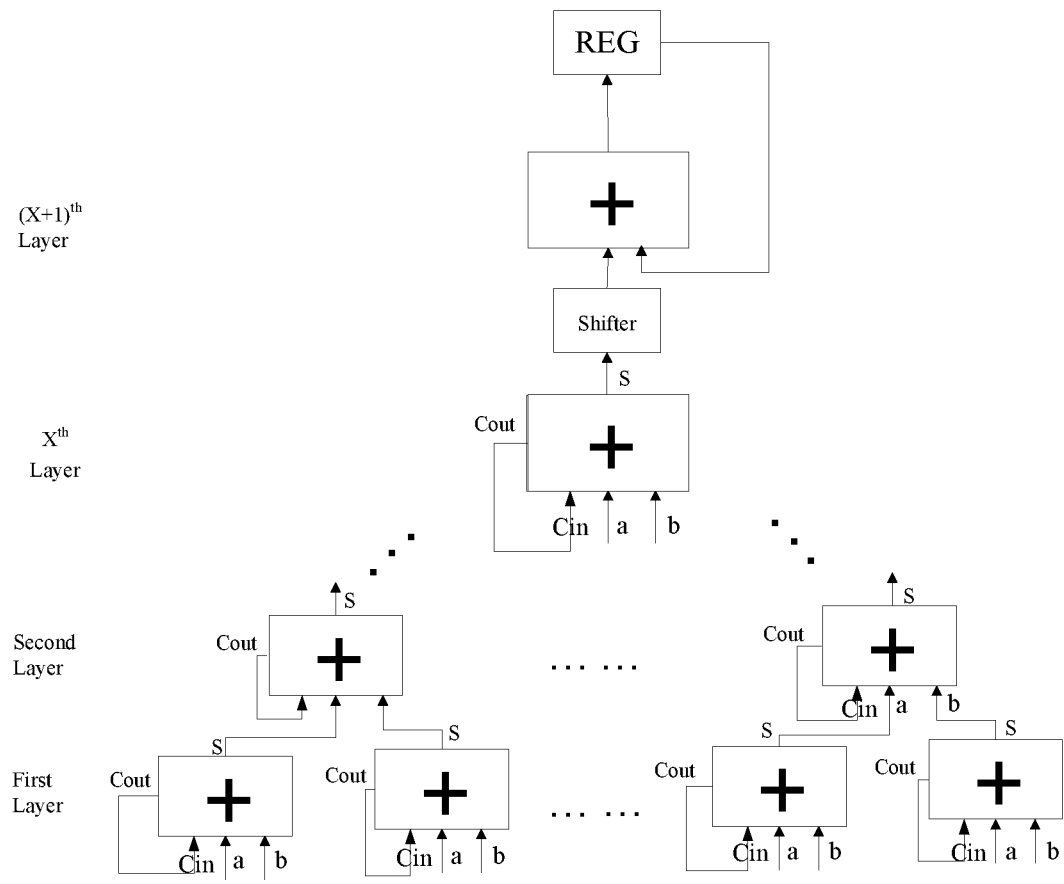
FIG. 5 is a schematic diagram of a bit serial addition tree device for the device of one embodiment of the present disclosure.

FIG. 5 is a schematic diagram of a bit serial addition tree device for the device of an embodiment of the present disclosure, which is capable of satisfying the requirement for dynamically configurable operation bit width. As shown by FIG. 5, for M data to be operated, the maximum bit width is N, wherein M and N both are positive integers. For data less than N bits, the number of bits thereof is supplemented to N bits in a reasonable manner without affecting the precision of the data. Possible manners include supplementing zeros at the highest/lowest bit, supplementing a sign bit to the highest/lowest bit, bit shifting, performing operation, and the like. The adders in the first layer to the $x^{th}$ layer in the bit-serial addition tree can complete addition on data of n (n≥1) bits, and the adder in the $(x+1)^{th}$ layer can complete addition on data of not less than N bits. First, the carry-in output terminal $C_{in}$ in the registers and respective adders is initialized to zero. The lowest n bits of each data to be operated are respectively input to a and b terminals of the adders of the first layer, and each adder completes the addition of the lowest n bits of the data to be operated which is input to the a and b terminals. The obtained result value s is transmitted to a or b terminals of adders of a higher layer. And the obtained carry-in value $C_{out}$, which is transmitted back to the carry-in $C_{in}$ of the adders in the present layer, is to undergo addition with the transmitted-in data to be operated in the next cycle. The operation of the adders of the next layer is similar. Addition operation on the transmitted-in data is performed, then the result is transmitted to a higher layer, and then the carry is transmitted back to the present layer, until the $x^{th}$ layer is reached. The adder of the $x^{th}$ layer shifts the operation result and adds the same to the original result transmitted from the register, and then saves the final result back to the register. Then, the next lowest n bits of the data to be operated are transmitted to the bit serial addition tree to accomplish corresponding operation. At this time, $C_{in}$ in each adder is the carry result outputted from the $C_{out}$ terminal of the adder in the previous cycle. Preferably, after the operation of the first-layer adders is completed, the second batch of n-bit data to be operated can be input. By parallel operation, the utilization rate of the operator may be improved, and the operation speed may further increase. When all operations are completed, the data in the register is the obtained result. In some embodiments, the adder may also be turned off during the operation when the data to be calculated (a, b terminals) and the carry input (Cin terminal) input to the adder are all 0 so as to achieve the goal of saving power.

Figure 6:
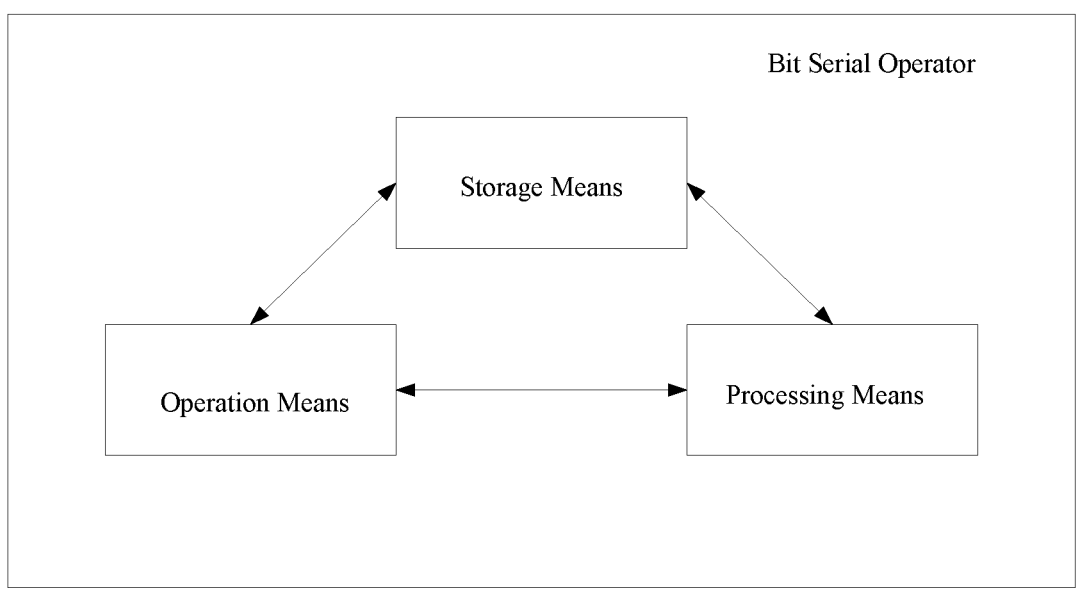
FIG. 6 is a block diagram of a bit serial operator in a processing device with dynamically configurable operation bit width of the present disclosure.

The bit serial operator used in the embodiment of the present disclosure, such as a basic multiplier or the like, as shown in FIG. 6, comprises an operation means, a processing means, and a storage means. The operation component is used to perform multiplication and/or addition on data of one or more bits, and the input data to be operated is data from the storage means and/or the data after being processed by the processing means, and the operation result output is directly transmitted into the storage means to be stored, or is transmitted to the processing means to be processed. The processing means can be used to perform processing such as data shifting, expanding/reducing data bit width according to a given rule, modifying one or more bits of data according to a given rule, or the like. The data to be processed by the processing means originates from the operation means and/or storage means, and the processed data can be transmitted to the operation means and/or the processing means. The storage means is used to store data, including data to be operated, intermediate operation results, final operation results, and the like. The storage means here may be an on-chip buffer. Each unit can be further subdivided into a plurality of units according to different functions thereof. For example, the operation means may be subdivided into a multiplication unit, an addition unit, and the like. A specific embodiment of the multiplier in the bit serial operator may comprise a first basic multiplier shown by FIG. 7, a second basic multiplier shown by FIG. 8, and a sparse multiplier device shown by FIG. 9.

Figure 7:
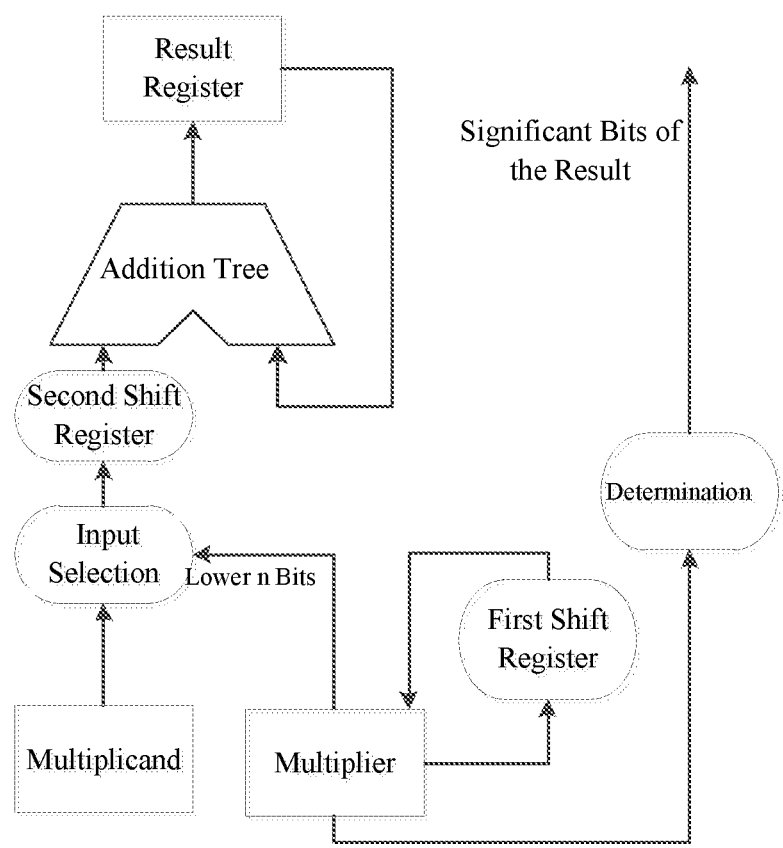
FIG. 7 is a structural schematic diagram of a first basic multiplier device provided in an embodiment of the present disclosure.

FIG. 7 is a schematic diagram of a specific embodiment of a bit serial operator of the present disclosure: a first basic multiplier device, which is capable of satisfying the requirement for dynamically configurable operation bit width. The first basic multiplier can be used in the device of the present disclosure. As shown by FIG. 7, for M bits of multiplicand and N bits of multiplier, M and N both are positive integers. The positions of the multiplier and the multiplicand can be exchanged under the control of a control module. The lower n bits of the multiplier (n is a positive integer, and 1≤n≤N, optionally 1<n≤N, which can further improve the parallelism of the operation, make better use of hardware resources, and speed up the operation) are input into an input selection circuit, and the lower n bits of the multiplier are respectively subject to AND operation with the multiplicand, that is, if the bit value of the multiplier is 1, the multiplicand itself is output, otherwise 0 is output. At the same time, the multiplier is sent to the first shift register for shifting to shift the lower n bits out, and then what input into the input selection circuit are the new lower n bits. The selection result of the input selection circuit is input up to a second shift register for corresponding shifting, and then sent to the addition tree for addition. What subject to the addition operation here are the data that has undergoing input selection and shifting and the result of the previous addition operation. The obtained result is stored as an intermediate result in a result register. When the multiplicand is subject to input selection and shifting next time, the result register reads the intermediate result and transmits it to the addition tree (device) to perform addition. When all bits of the multiplier are 0, the multiplication operation ends.

To more clearly show the operation flow of the first basic multiplier, we give a specific embodiment, assuming that the multiplicand is 10111011, that is, M=8, and the multiplier is 1011, that is, N=4.

When n=2, that is, each time 2 bits are shifted, the operation process is as follows. First, the lowest 2 bits of the multiplier, 11, are taken out, and are sent to the input selection circuit together with the multiplicand. It is both the multiplicand itself that is selected and is sent to the first shift register, and it is unnecessary to shift the selected multiplicand corresponding to the lowest bit, i.e., 10111011, and the selected multiplicand corresponding to the next lower bit is shifted to the left by 1 bit, that is, 101110110, and is sent to the addition tree. Since there is no data addition before, it is the sum of 10111011 and 101110110 that is sent to the result register, i.e., 1000110001. Then, the multiplier is shifted to the right by 2 bits and then the lowest 2 bits, that is, 10, are sent to the input selection circuit together with the multiplicand to obtain 0 and 10111011, and then by the second shift register, 0 is still 0 after being shifted to the left by 2 bits, and 10111011 is shift to the left by 3 bits to become 10111011000, which is sent to the addition tree together with 1000110001 in the result register to undergo operation, to obtain 100000001001, which is sent to the result register. At this time, the multiplier is shifted to the right by 2 bits, all of which are 0, that is, the operation ends, and it is the final operation result that is in the result register, i.e., 100000001001.

Figure 8:
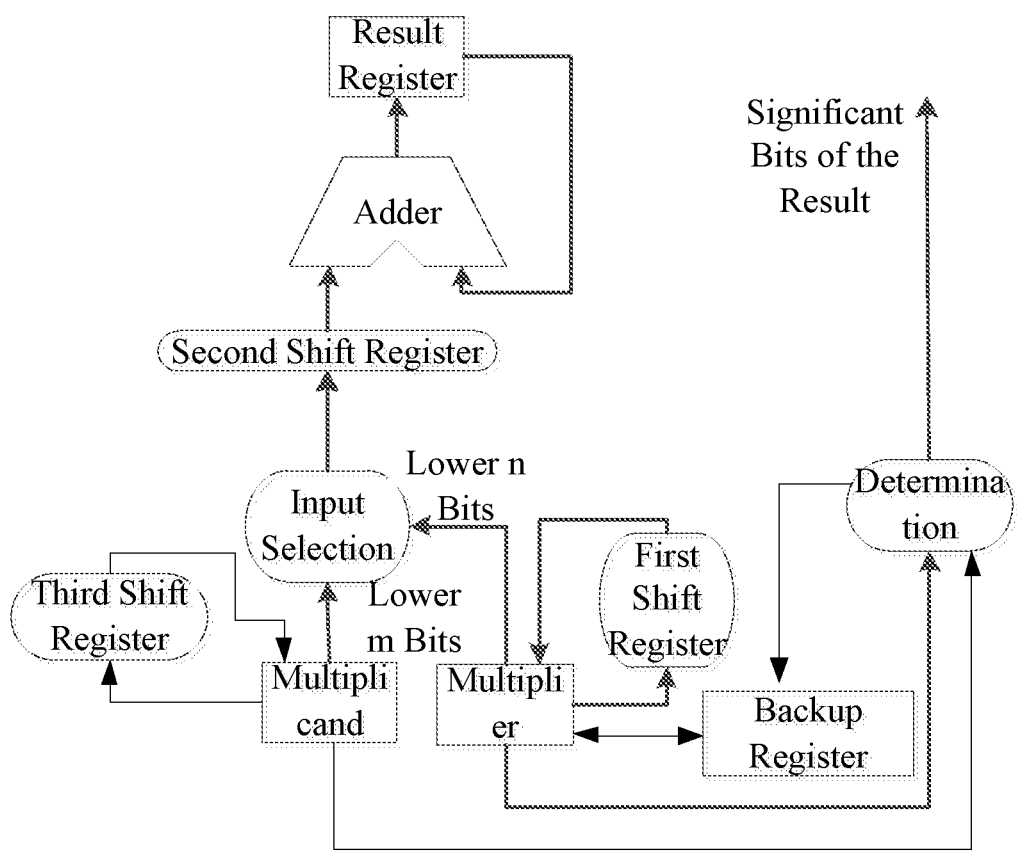
FIG. 8 is a structural schematic diagram of a second basic multiplier device provided in an embodiment of the present disclosure.

FIG. 8 is a schematic diagram of a second basic multiplier device used for the present device of another embodiment of the present disclosure, which is capable of satisfying the requirement for dynamically configurable operation bit width. As shown by FIG. 8, for M bits of multiplicand and N bits of multiplier, M and N both are positive integers. In the second basic multiplier device, the positions of the multiplier and the multiplicand can be exchanged under the control of a control module. The lower m bits of the multiplicand (m is a positive integer, and $1 \leq m \leq M$) are input into an input selection circuit, and the lower n bits of the multiplier (n is a positive integer, and $1 \leq n \leq N$) are input into the input selection circuit. The lower m bits of the multiplicand respectively are subject to multiplication with the lower n bits of the multiplier. And the multiplier is sent to the first shift register for shifting to shift the lower n bits out, and then what input into the input selection circuit are new lower n bits. The result of the input selection is input up to a second shift register for corresponding shifting, and then sent to the addition tree for addition. What subject to the addition operation here are the data that has undergone input selection and shifting, and the result of the previous addition operation. The obtained result is stored as an intermediate result in a result register. When the next time the multiplicand is subject to input selection and shifting, the result register reads the intermediate result and transmits it to the addition tree (adder) to perform addition. When all bits of the multiplier are 0, the multiplicand is sent to a third shift register for shifting to shift the lower m bits out, and the multiplier is taken out of a backup register, and the above operation steps are repeated. The multiplication operation ends until the multiplicand and the multiplier are both 0.

Figure 9:
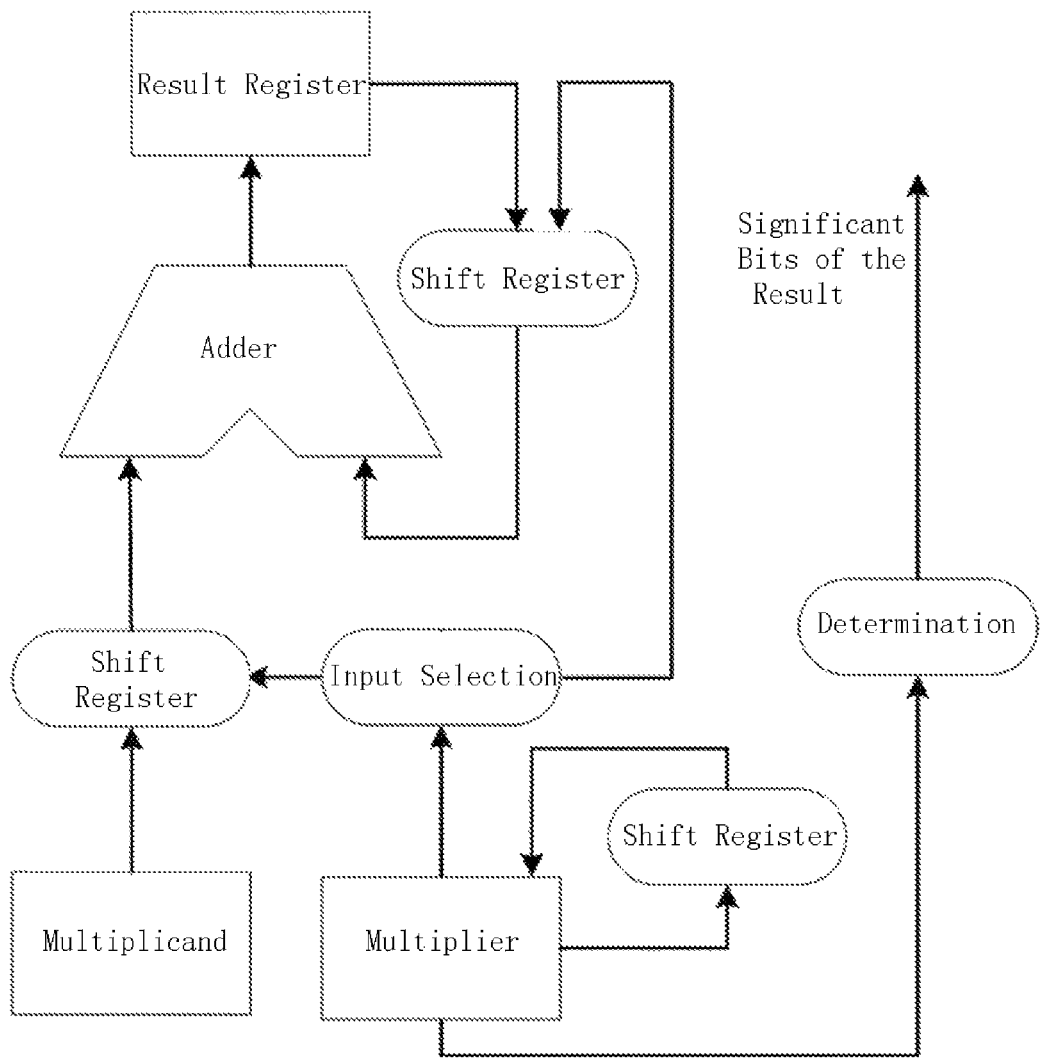
FIG. 9 is a structural schematic diagram of a sparse multiplier device provided in an embodiment of the present disclosure.

FIG. 9 is a schematic diagram of a sparse multiplier device used in the present device provided in an embodiment of the present disclosure, which is capable of satisfying the requirement for dynamically configurable operation bit width. The sparse multiplier can be used in the case of sparse operation, that is, when 1 in the binary representation of the multiplier or multiplicand is sparse, then the position of 1 in the multiplier or multiplicand is sparsely represented, which can further improve the effectiveness of the operation and can speed up the operation. As shown by FIG. 9, for M bits of multiplicand and N bits of multiplier, M and N both are positive integers. That is, the number of bits of the multiplicand and the multiplier here may or may not be equal. Here, the multiplier is represented in a sparse method, i.e., the position of 1 in the multiplier is represented by means of absolute or relative position. Here, the operation modules of the sparse multiplier provided in this embodiment are all configurable, so when the operation is performed using different representation methods, the devices inside the operation unit can be configured according to the needs. For instance, shifting is unnecessary for the result register upon addition operation, then a shift register connected to the result register can be configured to be inactive, and at this time the shift information of the multiplier may also not be transferred to the shift register. It can be understood by one skilled in the art that relevant details can be adjusted as needed to complete relevant specific details, such as the shift of the multiplicand and the addition operation of the result.

To more clearly show the operation flow of the sparse multiplier, we give a specific embodiment. Assuming that the multiplicand is 10111011, that is, M=8, and the multiplier is 00100010, that is, N=8. When the multiplier is represented in an absolute representation manner, the position of 1 in the multiplier is represented by the absolute position. Assuming that we call the rightmost bit of the number the 0th bit, the bit left to the 0th bit is called the 1st bit, and so on. Then, the multiplier is expressed as (1, 5). At the same time, we require that the shift register connected to the result register in this embodiment does not work, and the data of the multiplier does not need to be transferred to the shift register. Then the first number of multiplier is taken out first, which is 1, indicating that there is a 1 at the first bit. The multiplicand is sent to the shift register, and shifted by 1 bit to become 101110110 which is sent to the adder. Since the previous numbers are added, the result sent to the result register is 101110110. Then, the position of the next 1 of the multiplier, that is, 5, is taken out, and is sent to the shift register together with the multiplicand. In the shift register, the multiplicand is shifted right by 5 bits to obtain 1011101100000, which is sent to the adder. Meanwhile, the result 101110110 in the result register is taken out. Since shifting is unnecessary for the used absolute representation method, the result can be directly sent to the adder for addition to obtain 1100011010110. The result of the addition is again sent to the result register. At this point, 1 of the multiplier has all been calculated, so the operation ends. The multiplier can also be represented in a relative manner, and the representation thereof is defined as the number of bits between each two non-zero digits from the first non-zero digit from the highest (leftmost) bit to the lowest bit. For 00100010, there are 4 bits between the first digit that is not 0 and the next digit that is not 0, and there is one bit between the second digit that is not 0 and the lowest digit, so 00100010 is expressed as (4, 1). Here, it is required that the shift register connected to the result register and that connected to the multiplicand in this embodiment both need to operate. First, the first digit 4 of the multiplier is taken out and sent to the two shift registers. Then the multiplier is shifted to the right by 4 bits and sent to the adder together with the data in the result register which has been shifted to the right by 4 bits, to undergo addition operation. At this time, the data in the result register is 0, so the addition result 101110110000 is obtained and sent to the result register for saving. Then, the second digit 1 of the multiplier is taken out and sent to the shift register, to obtain 101110110 and 1011101100000, which are sent to the adder for addition, to obtain a result 1100011010110. The result is again sent to the result register. At this point, 1 in the multiplier has all been calculated, so the operation ends. In this way, the sparseness of the data can be effectively utilized, and only efficient operation, that is, operation between non-zero data is performed, thereby reducing non-effective operation, speeding up the operation, and improving the performance-to-power ratio.

Figure 10:
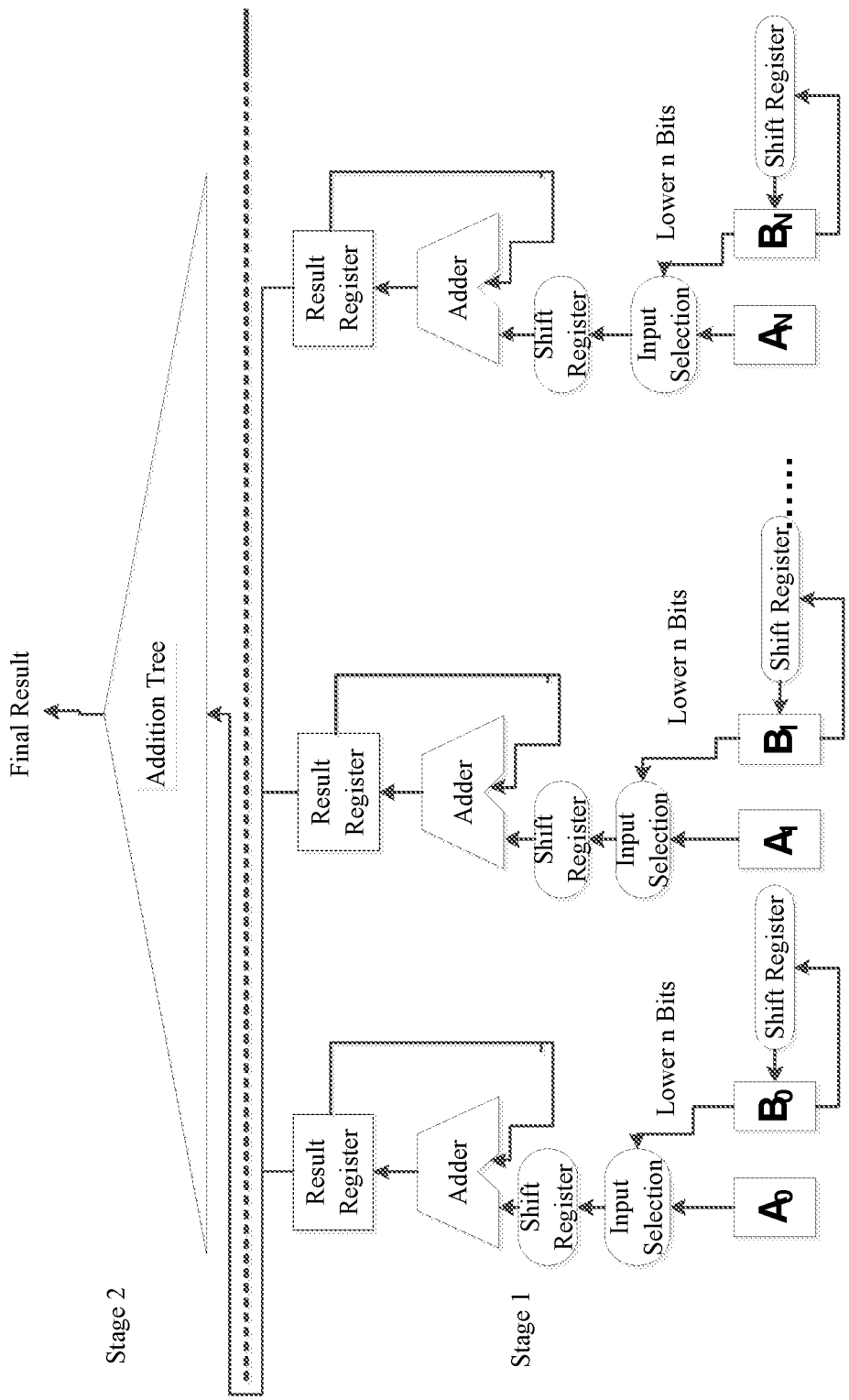
FIG. 10 is a structural schematic diagram of a device for performing vector multiplication by a basic multiplier or a sparse multiplier provided in an embodiment of the present disclosure.
Figure 11:
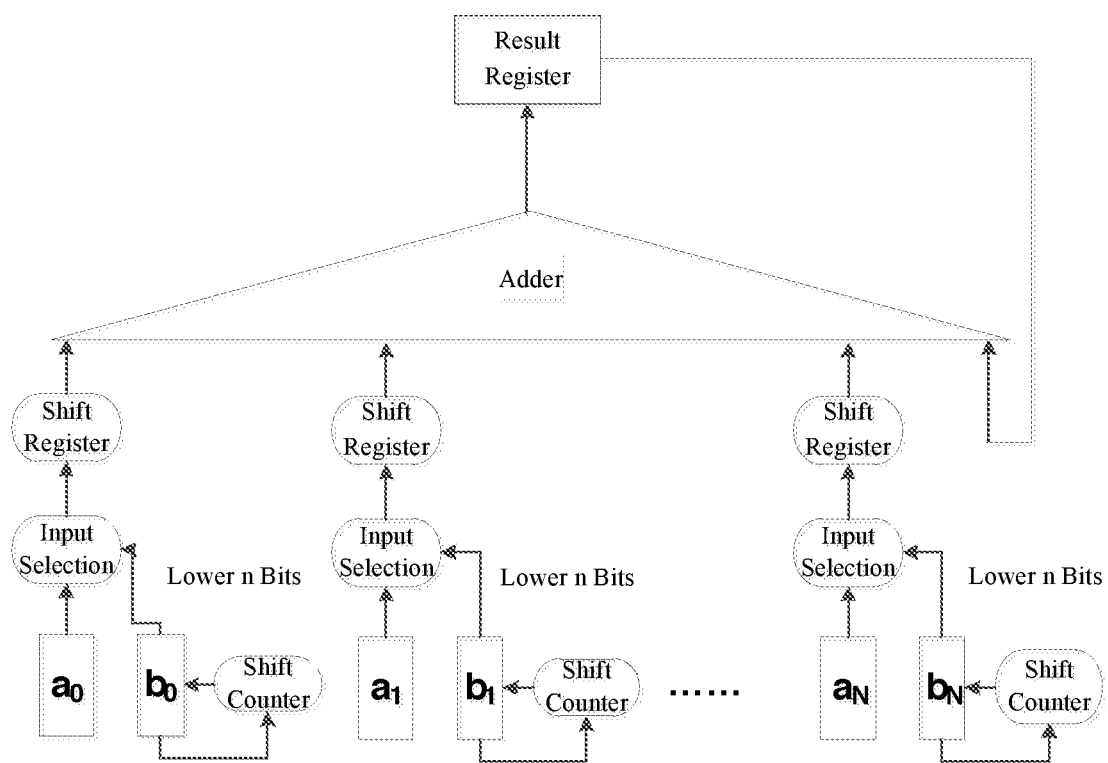
FIG. 11 is a structural schematic diagram of a device for performing vector multiplication by a fused vector multiplier provided in an embodiment of the present disclosure.

FIG. 10 is a schematic diagram of a device for performing vector multiplication by a fused vector multiplier provided in an embodiment of the present disclosure. Here, it is assumed that an inner product of vectors $\vec{A}\{A_N \ldots A_2 A_1 A_0\}$ and $\vec{B}\{B_N \ldots B_2 B_1 B_0\}$ is calculated, and the data of the corresponding dimension is sent to the multiplier for operation, as shown in FIG. 11. Here, it is required that the dimensions of $\vec{A}$ and $\vec{B}$ are the same, both being (N+1), but the bit width of each dimension is not necessarily the same. And it is meanwhile assumed that n bits are taken for operation each time, wherein n is a positive integer larger than 1 but representing a bit width not larger than that of $\vec{B}$. First, the lower n bits of $B_0$ are sent together with $A_0$ to an input selection circuit, AND operations between the lower n bits of $B_0$ and $A_0$ are performed respectively, and the result of the selection is sent to a subsequent shift register for shifting. After the shifting, the result is sent to an addition tree. In this process, each dimension undergoes the same operation as the first dimension. Then the data sent from these dimensions undergoes addition by the addition tree, and the value in the result register is sent to the addition tree to undergo addition operation together, and the obtained result of the addition is sent to the result register. At the same time of operation, the $B_i$ (i=0, 1, ..., N) value of each dimension is sent to the shift register and shifted to the right by n bits, and then the above operation is repeated, that is, the lowest n bits of the shifted $B_i$ (i=0, 1, ..., N) value and the corresponding $A_i$ (i=0, 1, ..., N) value are sent to the input selection circuit to undergo selection, and then are sent to the shift register for shifting, and then are sent to the addition tree to undergo addition operation. This process is repeated until the $B_i$ (i=0, 1, ..., N) values of each dimension are all 0, and the operation ends. At this time, the data in the result register is the final result of the operation. The multiplier can flexibly configure the bit width of the data to be operated without the need to re-count the shifted bits of the multiplicand each time a set of data multiplication is performed. At the same time, when the number of data bits is relatively low or the number of vector bits is relatively high, the characteristics of low bit width and high vector dimension of the data can be greatly utilized, and the process can be executed in parallel by means of pipeline, which reduces the time required for operation, further speed up the operation and improve the performance-to-power ratio.

Figure 12:
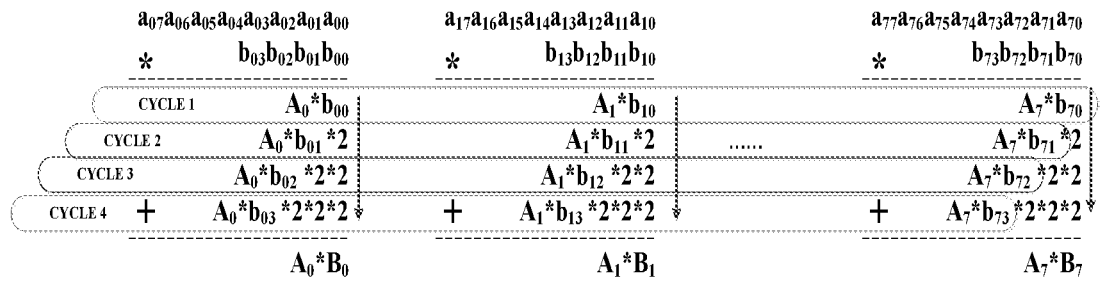
FIG. 12 is a structural schematic diagram of a specific implementation flow of a fused vector multiplier device and other multiplier devices provided by the present disclosure.

To more clearly illustrate the operation flow of the fused vector multiplier and the differences and advantages of the operation flow of the multiplier over other multiplier, a specific embodiment will be described with reference to FIG. 10, FIG. 11 and FIG. 12. First, we assume that the dimensions of $\vec{A}$ and $\vec{B}$ are 8, that is, N=7, $\vec{A}\{A_7 \ldots A_2 A_1 A_0\}$, $\vec{B}\{B_7 \ldots B_2 B_1 B_0\}$, and the bit width of A is 8 bits, that is, each dimension of A is 8 bits, $A_i=\{a_{i7} \ldots a_{i1} a_{i0}\}$, where i=0, 1, ..., 7; B has a bit width of 4 bits, that is, each dimension of B is 4 bits, $B_i=\{b_{i3}b_{i2}b_{i1}b_{i0}\}$, where i=0, 1, ..., 7. Then the vector inner product $\vec{A} \cdot \vec{B} = A_7B_7+A_6B_6+A_5B_5+A_4B_4+A_3B_3+A_2B_2+A_1B_1+A_0B_0$.

In general, the operation flow using the basic multiplier or the above-described basic or sparse multiplier (assuming that n is 2, that is, the multiplier is shifted by 2 bits each time) is divided into two stages: at first, the products of respective components are calculated separately, and then they are subject to summation, as shown in FIG. 10. Specifically, calculation is performed on a certain dimension of Ai and Bi, and the shift register is cleared. In the first clock cycle, the lowest two bits $b_{i0}$ and $b_{i1}$ of Bi are taken and subject to input selection and shifting and are transmitted to an adder to obtain a value of $Ai*b_{i0}b_{i1}$, and the shift register is added by 2; in the second clock cycle, Bi is shifted to the right by 2 bits, and the lowest two bits are taken to obtain the lowest bits $b_{i2}$, $b_{i3}$, which are subject to input selection and shifting to obtain $Ai*b_{i2}b_{i3}$; this result is added to the previous product to obtain the final operation result $Ai*b_{i0}b_{i1}b_{i2}b_{i3}$, that is, the final operation result Ai*Bi of this dimension is obtained. Operation of the next dimension is performed. $A_{i+1}$ and $B_{i+1}$ are input, and the shift register is cleared, ... until the operation of each dimension is completed, to obtain ($A_0*B_0$, $A_1*B_1$, ..., $A_7*B_7$). The operation in stage 1 is completed. Then, in stage 2, the products are sent to an addition tree for addition, to obtain the final result of the vector inner product, i.e., $\vec{A} \cdot \vec{B}$. In stage 1, one multiplier can be selected to calculate each dimension in turn; multiple multiplier may also be provided to carry out parallel operation and complete operation of one dimension in one multiplier, as shown in FIG. 11 and FIG. 12. When multiple multiplier are used, the shift value of the multiplier $B_i$ of each dimension needs to be recounted. The multiplier at this stage 1 may employ the first basic multiplier, the second basic multiplier, or the sparse multiplier described above.

Figure 13:
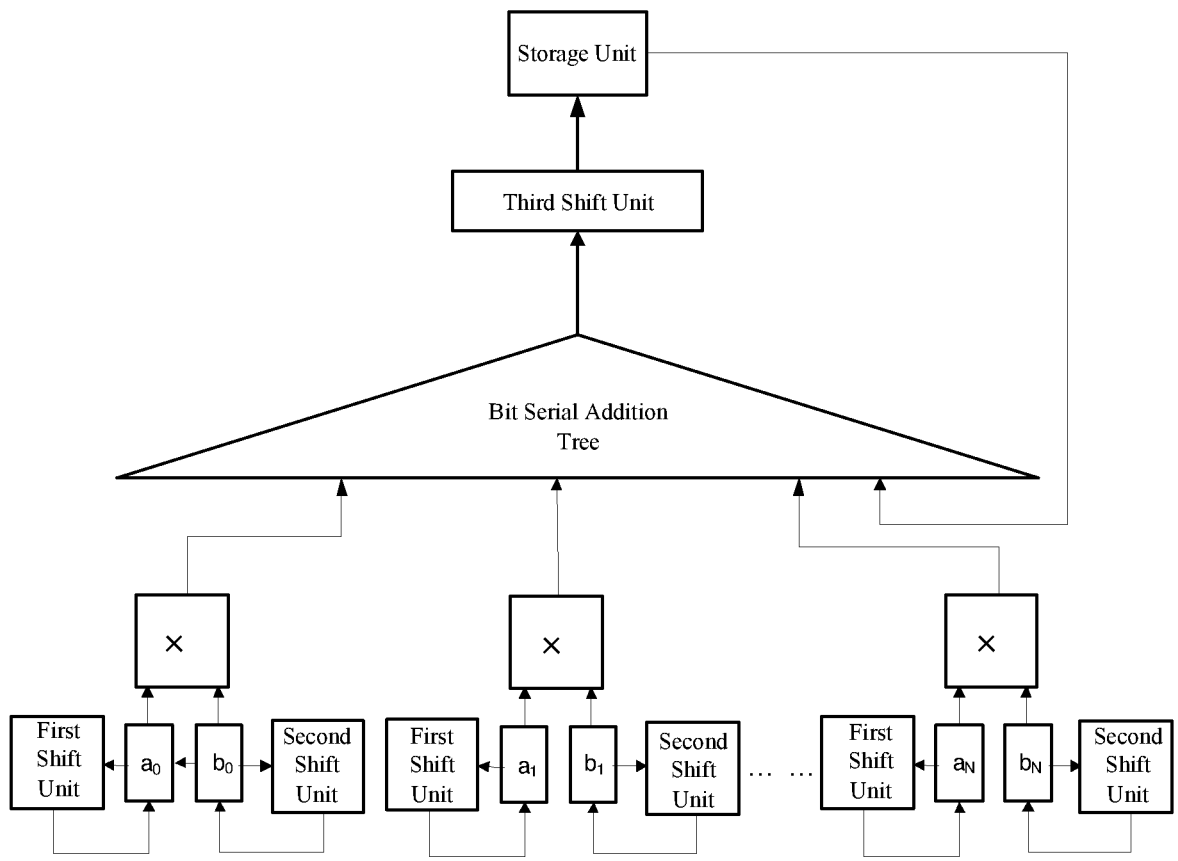
FIG. 13 is a schematic diagram showing the combination of a second basic multiplier and a bit serial addition tree according to one embodiment of the present disclosure.

The above-mentioned operation units can perform the required operations in any combination. For example, the second basic multiplier and the bit serial addition tree are combined, as shown in FIG. 13, to perform vector multiplication. Here, it is assumed that the inner product values of the vectors $\vec{A}\{A_N \ldots A_2 A_1 A_0\}$ and $\vec{B}\{B_N \ldots B_2 B_1 B_0\}$ are to be calculated, and the data of the corresponding dimension is sent to the multiplier to wait for the operation, as shown in FIG. 11. Here, it is required that the dimensions of $\vec{A}$ and $\vec{B}$ are the same, both being (N+1), but the bit width of each dimension is not necessarily the same, and it is meanwhile assumed that A is a multiplicand and B is a multiplier, in each operation, specified m bits of A are taken and specified n bits of B are taken to undergo operation, wherein m is a positive integer not larger than the bit width of one dimension of $\vec{A}$, and n is a positive integer not larger than the bit width of one dimension of $\vec{B}$. At first, the lower m bits of $A_0$ and the lower n bits of $B_0$ are taken and multiplied in the multiplier, and the obtained selected result is sent to the bit serial addition tree for addition. The result is stored in a storage unit. Next, B is shifted by n bits and multiplied with the lower m bits of A, and the result is sent to the bit serial addition tree for addition, together with the original data in the storage unit after undergoing shifting by a third shift unit, and the result is stored in the storage unit. After all operation of B is completed, A is shifted by m bits and again undergoes operation with the n bits of B in turn. When all operations end, the data in the storage unit is the final result of the operation. The present multiplier can flexibly configure the bit width of the data to be operated without saving the intermediate data, thereby reducing the storage overhead, and speeding up the operation. At the same time, when the number of data bits is relatively low or the dimension of the vector is relatively high, the characteristics of low bit width and high vector dimension of the data can be greatly utilized, and the process can be executed in parallel by means of pipeline, which reduces the time required for operation, further speed up the operation and improve the performance-to-power ratio.

To sum up, the device and the method of this embodiment can significantly improve the operation speed of the neural network, and meanwhile have dynamic configurability, meet related requirements of diversity of data bit width and dynamic variability of data bit width in the operation process, and have the advantages of strong flexibility, high configurability, fast operation speed, low power consumption or the like.

Figure 14:
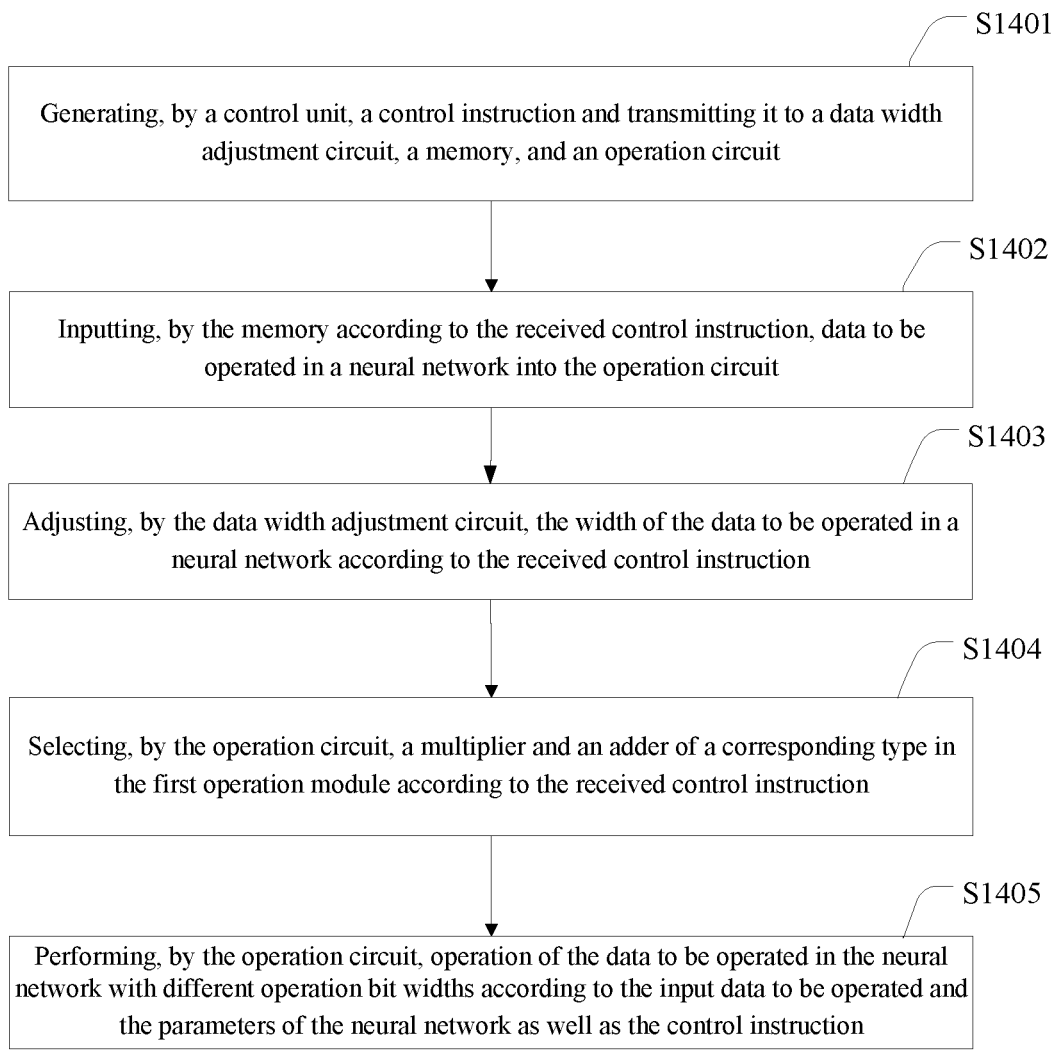
FIG. 14 is a flowchart of a processing method with dynamically configurable operation bit width provided by an embodiment of the present disclosure.

According to another aspect of the embodiment of the present disclosure, there is also provided a processing method of a processing device with dynamically configurable operation bit width, with reference to FIG. 14, which comprises the following steps:

S1401 generating, by a control unit, a control instruction and transmitting it to a memory, a data width adjustment circuit and an operation circuit;

S1402 inputting, by the memory, data to be operated in a neural network into the operation circuit according to the received control instruction;

S1403 adjusting, by the data width adjustment circuit, the width of the data to be operated, the intermediate operation result, the final operation result and/or the data to be buffered according to the practical needs;

S1404 selecting, by the operation circuit, a multiplier and adder circuit bit serial operator of a corresponding type according to the received control instruction;

S1405 performing, by the operation circuit, operation of the data to be operated with different operation bit widths of the neural network according to the input data to be operated and the parameters of the neural network as well as the control instruction.

In view of the foregoing, the data width adjustment circuit in the method of the embodiment can significantly improve the operation speed of the neural network, and has dynamic configurability and satisfies relevant requirements of the diversity of the data bit width and the dynamic variability of the data bit width during the operation.

Furthermore, the first operation module in step S1405 includes performing operation on the data to be operated in the neural network by using an adder circuit, and a basic multiplier, a sparse multiplier, and/or a fused vector multiplier. By dynamically selecting a specific adder circuit, as well as a basic multiplier, a sparse multiplier, and/or a fused vector multiplier, the processing method becomes flexible, configurable, realizes fast operation and low power consumption.

Hereinafter, an embodiment of a processing device and a processing method with dynamically configurable operation bit width of another solution will be described. The solution introduced below will not comprise a data width adjustment circuit and functional units related to the data width adjustment circuit.

Figure 15:
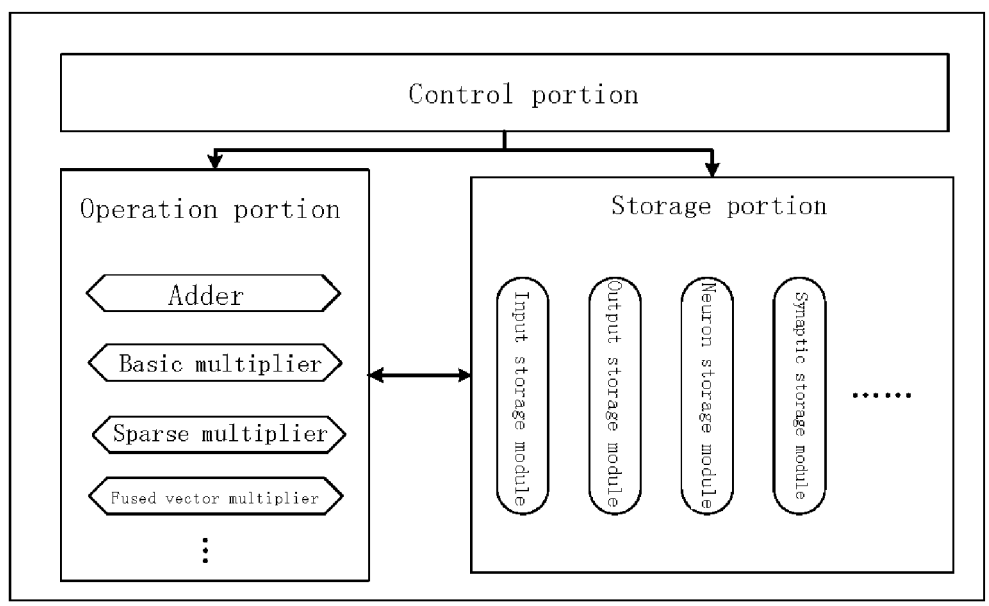
FIG. 15 is a structural schematic diagram of a processing device with dynamically configurable operation bit width provided in an embodiment of the present disclosure.

FIG. 15 is a schematic diagram of a processing device provided in another embodiment of the present disclosure. As shown by FIG. 15, this device mainly comprises three parts, a control circuit, an operation circuit and a memory. The control circuit sends a control signal to the operation circuit and the memory to control operation of them and coordinate the data transmission between the two. For functions of respective parts, please refer to what described for respective parts in the embodiment shown by FIG. 1, and details are not described herein.

Figure 16:
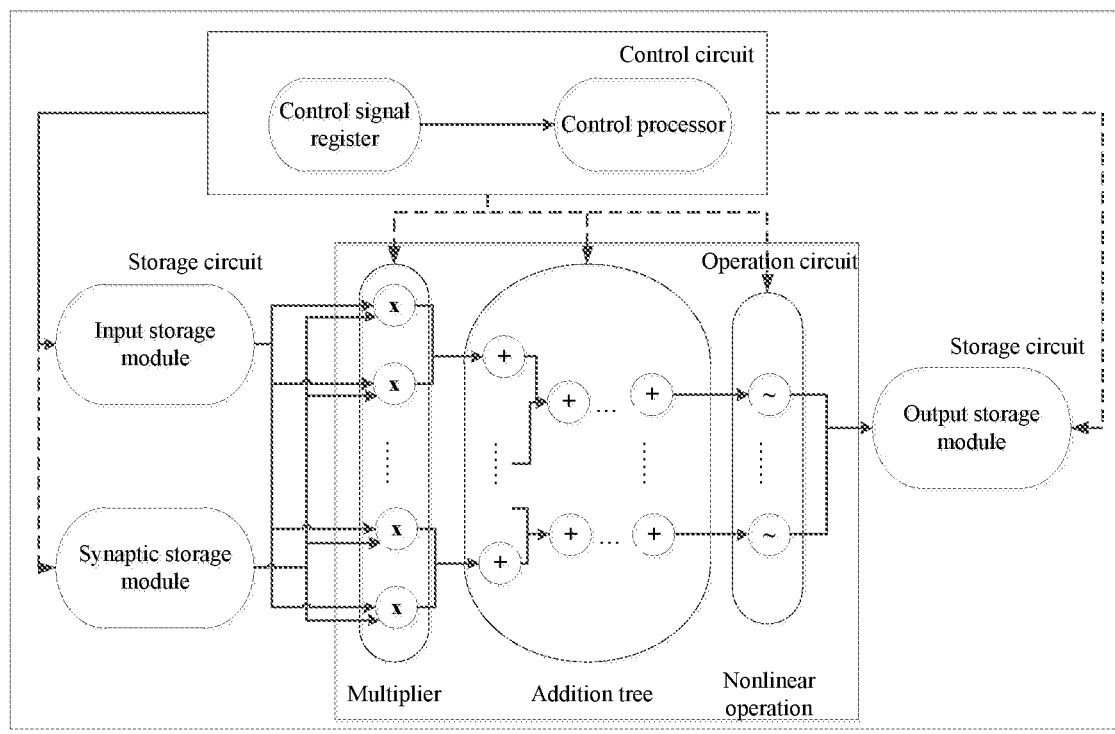
FIG. 16 is a structural schematic diagram of a processing device with dynamically configurable operation bit width provided in another embodiment of the present disclosure.

FIG. 16 is a schematic diagram of a processing device provided in another embodiment of the present disclosure. The structure shown by FIG. 16 is the same as the structure shown by FIG. 2 with the data width adjustment circuit removed, i.e., the memory is directly connected with the operation circuit, and for respective corresponding setting manners one can refer to the above. The three modules can be executed in parallel in a pipelined manner. The device can speed up the operation process of a convolutional neural network, reduce the on-chip and off-chip data exchange, and save storage space.

Figure 17:
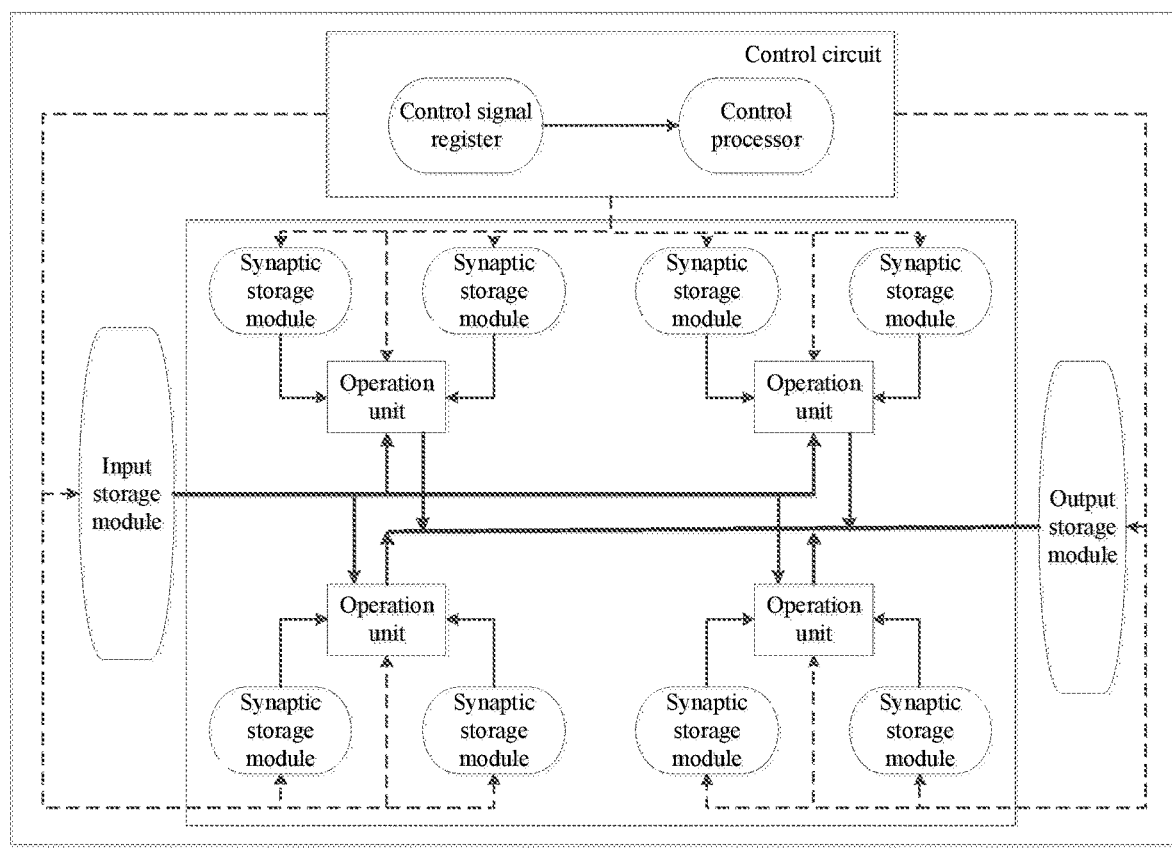
FIG. 17 is a structural schematic diagram of a processing device with dynamically configurable operation bit width provided in a further embodiment of the present disclosure.

FIG. 17 is a schematic diagram of a processing device provided in yet another embodiment of the present disclosure. The structure shown by FIG. 17 is similar to FIG. 3, except the difference that FIG. 17 does not include the relevant structure and connection relationship of the data width adjustment circuit. For respective connection relationship and the realized functions in FIG. 17, please refer to description of the corresponding embodiment of FIG. 3, and details are not described herein. The processing device of this embodiment significantly improves the operation efficiency in a large-scale operation with many parameters. The present device can effectively accelerate the operation process of a convolutional neural network, and can be especially suitable for large network scale with many parameters.

Figure 18:
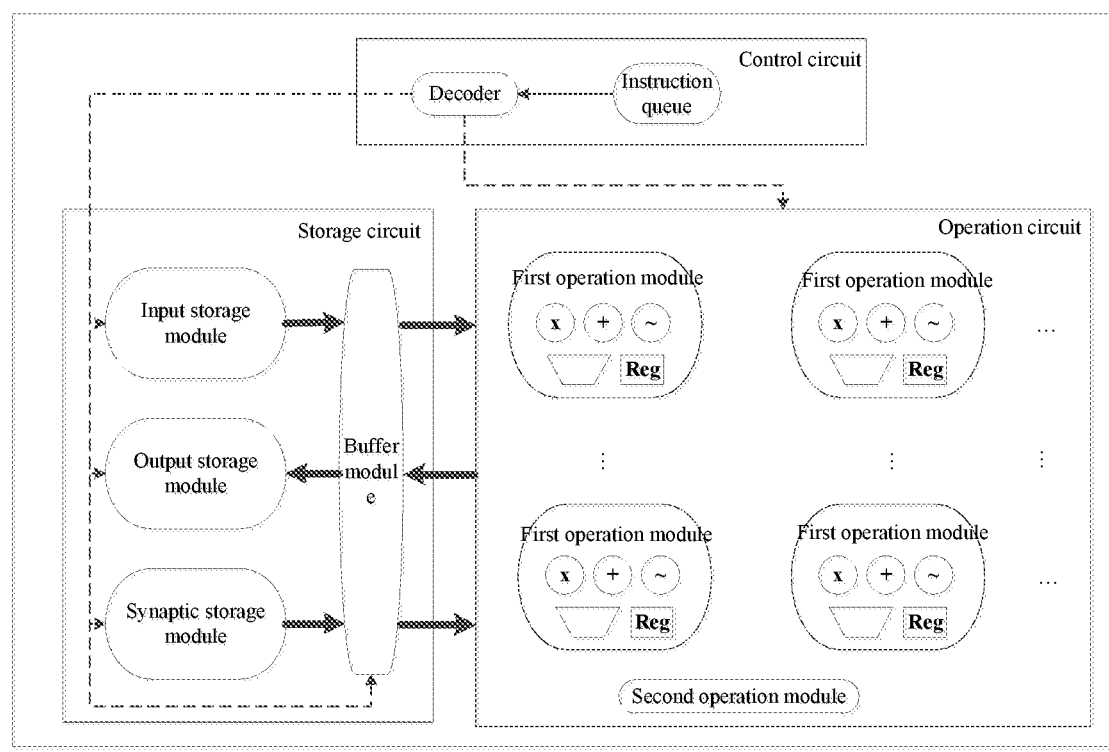
FIG. 18 is a structural schematic diagram of another embodiment of a processing device with dynamically configurable operation bit width provided in yet another embodiment of the present disclosure.

FIG. 18 is a schematic diagram of a processing device provided in a further embodiment of the present disclosure. The structure shown by FIG. 18 is similar to FIG. 4, except the difference that FIG. 18 does not include the relevant structure and connection relationship of the data width adjustment circuit. For respective connection relationship and the realized functions in FIG. 18, please refer to description of the corresponding embodiment of FIG. 4, and details are not described herein.

Figure 19:
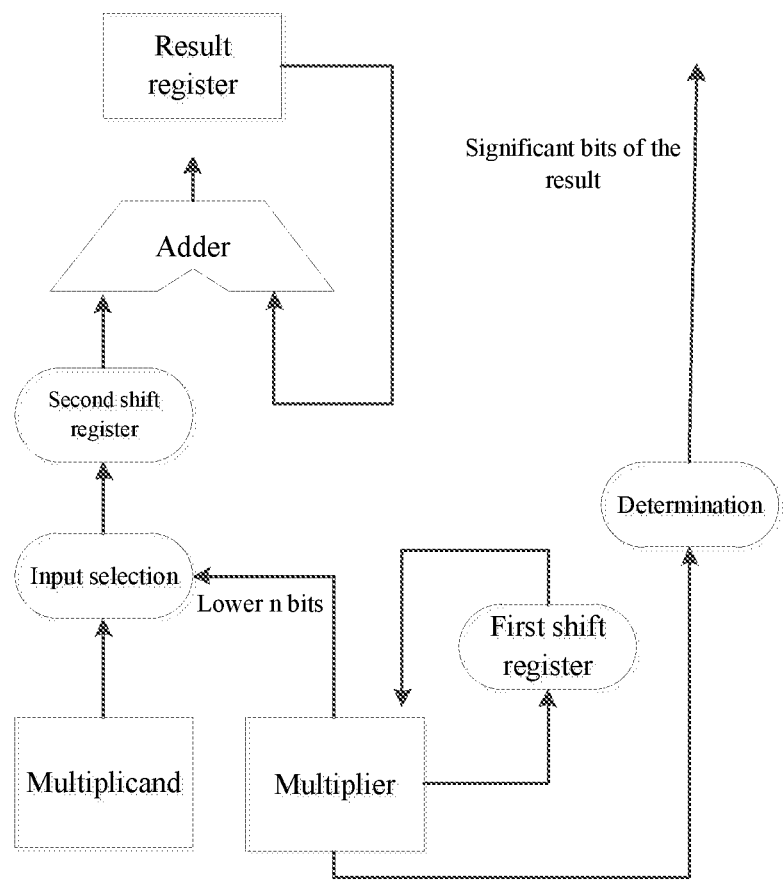
FIG. 19 is a structural schematic diagram of a basic multiplier device provided in an embodiment of the present disclosure.

FIG. 19 is a schematic diagram of a basic multiplier device used in the device provided in an embodiment of the present disclosure, which is capable of satisfying the requirement of dynamically configurable operation bit width. As shown by FIG. 19, for M bits of multiplicand and N bits of multiplier, M and N both are positive integers. That is, the bits of the multiplicand can be equal to or not equal to the bits of the multiplier. The lower n bits of the multiplier (n is a positive integer, and $1 \leq n \leq N$) are input into the input selection circuit. AND operation is performed between the respective values at lower n bits of the multiplier and the multiplicand, that is, if a value at a bit of the multiplier is 1, the multiplicand itself is obtained; otherwise, 0 is obtained. Meanwhile, the multiplier is sent to the first shift register for shifting to shift the lower n bits out, and what input into the input selection circuit next time are the new lower n bits. The result of the input selection is input up to a second shift register for corresponding shifting, and then sent to the addition tree for addition. What subject to the addition operation here are the data that has undergone input selection and shifting and the result of the previous addition operation. The obtained result is stored as an intermediate result in a result register. When the multiplicand is subject to input selection and shifting next time, the result register reads the intermediate result and transmits it to the addition tree (adder) to perform addition. When multiplier are all 0, the multiplication operation ends.

To more clearly show the operation flow of the basic multiplier, we give a specific embodiment assuming that the multiplicand is 10111011, that is, M=8, and the multiplier is 1011, that is, N=4.

When n=2, that is, each time 2 bits are shifted, the operation process is as follows: first, the lowest 2 bits of the multiplier, 11, are taken out, and are sent to the input selection circuit together with the multiplicand. It is both the multiplicand itself that is selected and is sent to the second shift register, and it is unnecessary to shift the selected multiplicand corresponding to the lowest bit, i.e., 10111011, and the selected multiplicand corresponding to the next lower bit is shifted to the left by 1 bit, that is, 101110110, and is sent to the addition tree. Since there is no data addition before, it is the sum of 10111011 and 101110110 that is sent to the result register, i.e., 1000110001. Then, the multiplier is shifted to the right by 2 bits and then the lowest 2 bits, that is, 10, are sent to the input selection circuit together with the multiplicand to obtain 0 and 10111011. Then, by the shift register, 0 is still 0 after being shifted to the left by 2 bits, and 10111011 is shift to the left by 3 bits to become 10111011000, which is sent to the addition tree together with 1000110001 in the result register to undergo operation, to obtain 100000001001, which is sent to the result register. At this time, the multiplier is shifted to the right by 2 bits, all of which are 0, so the operation ends, and it is the final operation result that is in the result register, i.e., 100000001001.

Figure 20:
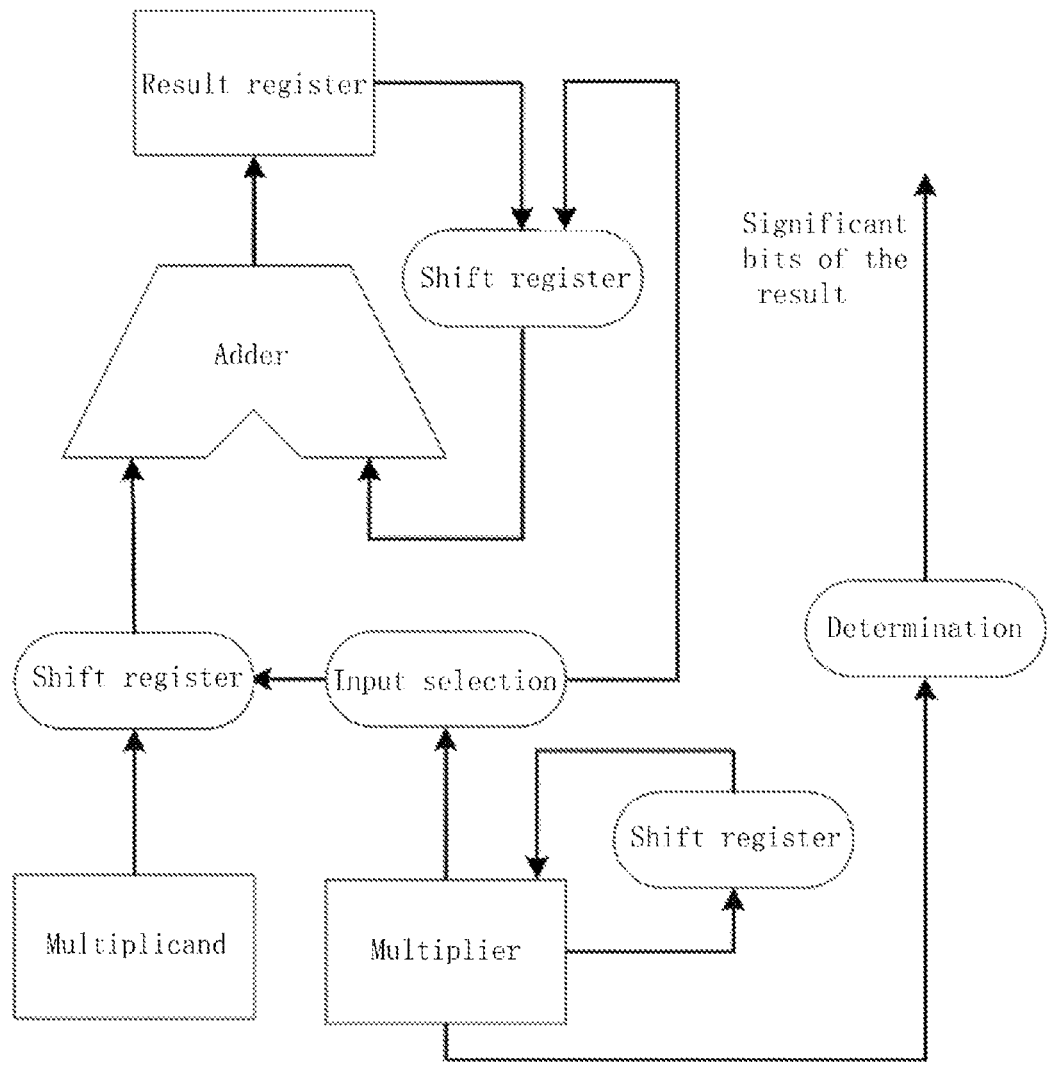
FIG. 20 is a structural schematic diagram of a sparse multiplier device provided in an embodiment of the present disclosure.

FIG. 20 is a schematic diagram of a sparse multiplier device used in the present device provided in an embodiment of the present disclosure, which is capable of satisfying the requirement for dynamically configurable operation bit width. As the name suggests, the sparse multiplier is used for sparse operation, that is, when the position of 1 is represented by means of sparse representation by the multiplier or multiplicand, it can further improve the effectiveness of the operation and speed up the operation. As shown by FIG. 20, for M bits of multiplicand and N bits of multiplier, M and N both are positive integers. That is, the number of bits of the multiplicand and the multiplier here may or may not be equal. Here, the multiplier is represented in a sparse method, i.e., the position of 1 in the multiplier is represented by means of absolute or relative position. Here, the operation circuit is configurable, so when the operation is performed by using different representation methods, the devices inside the operation unit can be configured according to requirements. For instance, when shifting is unnecessary for the result register upon addition operation, a shift register connected to the result register can be configured to be inactive at this time, and the shift information of the multiplier can also not be transferred to the shift register. It can be understood by one skilled in the art that relevant details can be adjusted as needed to complete relevant specific details such as the shift of the multiplicand and the addition of the result.

To more clearly show the operation flow of the sparse multiplier, we give a specific embodiment, assuming that the multiplicand is 10111011, that is, M=8, and the multiplier is 00100010, that is, N=8. When the multiplier is represented in an absolute representation manner, the position of 1 in the multiplier is represented by the absolute position. Assuming that we call the rightmost bit of the number the 0th bit, the left bit to the 0th bit is called the 1st bit, and so on. Then, the multiplier is expressed as (1, 5). At the same time, we require that the shift register connected to the result register in this embodiment does not work, and the data of the multiplier does not need to be transferred to the shift register. Then the first number of multiplier is taken out first, which is 1, indicating that there is a 1 at the first bit. The multiplicand is sent to the shift register, and shifted by 1 bit to become 101110110, which is sent to the adder. Since the previous numbers are added, the result sent to the result register is 101110110. Then, the position of the next 1 of the multiplier, that is, 5, is taken out, and is sent to the shift register together with the multiplicand. In the shift register, the multiplicand is shifted right by 5 bits to obtain 1011101100000, which is sent to the adder. Meanwhile, the result 101110110 in the result register is taken out. Since shifting is unnecessary for the used absolute representation method, the result can be directly sent to the adder for addition to obtain 1100011010110. The result of the addition is again sent to the result register. At this point, 1 of the multiplier has been calculated, so the operation ends. If the multiplier is expressed in a relative manner, the representation thereof is defined as the number of bits between each two digits that are not 0 from first digit that is not 0 at the highest bit (leftmost) to the lowest bit. For 00100010, there are 4 bits between the first digit that is not 0 and the next digit that is not 0, and there is one bit between the second digit that is not 0 and the lowest digit, so it is expressed as (4, 1). Here in this embodiment, it is required that the shift registers connected with the result register and with the multiplicand all operate. First, the first digit 4 of the multiplier is taken out and sent to the two shift registers. Then the multiplier is shifted to the right by 4 bits and sent to the adder together with the data in the result register that is shifted to the right by 4 bits, to undergo accumulation. At this time, the data in the result register is 0, so the addition result 101110110000 is obtained, and sent to the result register. Then, the second digit 1 of the multiplier is taken out and sent to the shift register, to obtain 101110110 and 1011101100000, which are sent to the adder for accumulation, to obtain a result 1100011010110. The result is again sent to the result register. At this point, 1 in the multiplier has been calculated, so the operation ends. In this way, the sparseness of the data can be effectively utilized, and only efficient operation, that is, operation between non-zero data is performed, thereby reducing non-effective operation, speeding up the operation, and improving the performance-to-power ratio.

Figure 22:
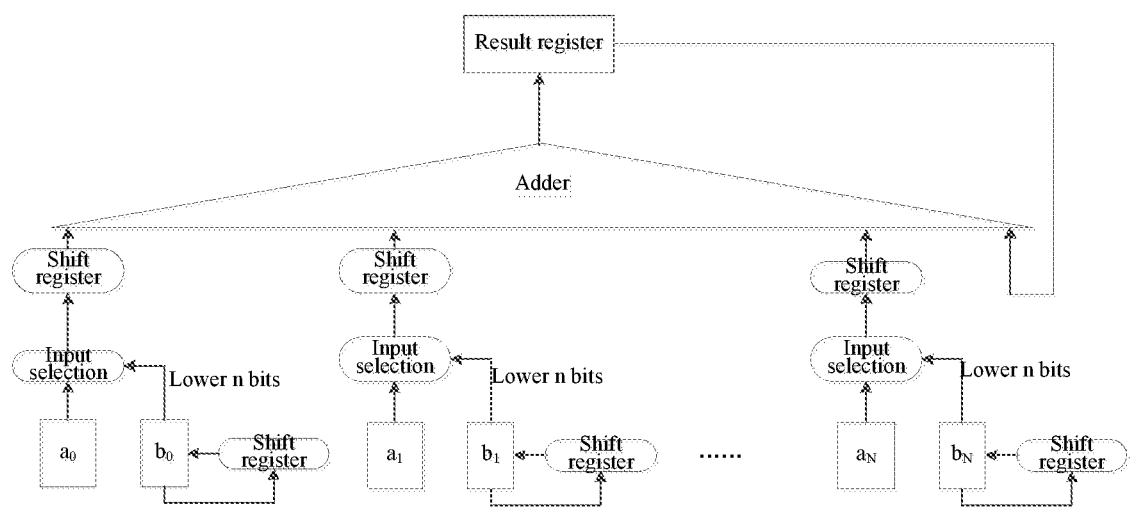
FIG. 22 is a structural schematic diagram of a device for performing vector multiplication by a fused vector multiplier provided in an embodiment of the present disclosure.

FIG. 22 is a schematic diagram of a device for performing vector multiplication by a fused vector multiplier provided in an embodiment of the present disclosure. Here, it is assumed that an inner product of vectors $\vec{A}\{A_N \ldots A_2 A_1 A_0\}$ and $\vec{B}\{B_N \ldots B_2 B_1 B_0\}$ is calculated, and the data of the corresponding dimension is sent to the multiplier for operation, as shown in FIG. 8. Here, it is required that the dimensions of $\vec{A}$ and $\vec{B}$ are the same, both being (N+1), but the bit width of each dimension is not necessarily the same. It is meanwhile assumed that n bits are taken for operation each time, wherein n is a positive integer representing a bit width larger than 1 but not larger than the bit width of one dimension of $\vec{B}$. First, the lower n bits of $B_0$ are sent together with $A_0$ to an input selection circuit, the AND operation between the lower n bits of $B_0$ and $A_0$ is performed, and the result of the selection is sent to a subsequent shift register for shifting. After the shifting, the result is sent to an addition tree. In this process, each dimension undergoes the same operation as the first dimension. Then the data sent from these dimensions undergoes addition by the addition tree, the value in the result register is sent to the addition tree to undergo addition operation together, and the obtained result of the addition is sent to the result register. At the same time of operation, the $B_i$ (i=0, 1, . . . , N) value of each dimension is sent to the shift register and shifted to the right by n bits, then the above operation is repeated, that is, the lowest n bits of the shifted $B_i$ (i=0, 1, . . . , N) value and corresponding $A_i$ (i=0, 1, . . . , N) are sent to the input selection circuit to undergo selection, and then are sent to the shift register for shifting, and then are sent to the addition tree to undergo addition operation. This process is repeated until the $B_i$ (i=0, 1, . . . , N) values of each dimension are all 0, and the operation ends. At this time, the data in the result register is the final result of the operation. The multiplier can flexibly configure the bit width of the data to be operated without the need to re-count the shifted bits of the multiplicand each time a set of data multiplication is performed. At the same time, when the number of data bits is relatively low or the number of vector dimensions is relatively high, the characteristics of low bit width and high vector dimension of the data can be greatly utilized, and the process can be executed in parallel by means of pipeline, which reduces the time required for operation and further speed up the operation and improve the performance-to-power ratio.

The operation of inner product of the vectors can be accomplished in a variety of ways, as explained with reference to FIG. 21, FIG. 22, and FIG. 23. First, we assume that the dimensions of $\vec{A}$ and $\vec{B}$ are 8, that is, N=7, $\vec{A}\{A_7 \ldots A_2 A_1 A_0\}$, $\vec{B}\{B_7 \ldots B_2 B_1 B_0\}$, and the bit width of $\vec{A}$ is 8 bits, that is, each dimension of $\vec{A}$ is 8 bits, that is, $A_i=\{a_{i7} \ldots a_{i1} a_{i0}\}$, where i=0, 1, . . . , 7; $\vec{B}$ has a bit width of 4 bits, that is, each dimension of $\vec{B}$ is 4 bits, that is, $B_i=\{b_{i3}b_{i2}b_{i1}b_{i0}\}$, where i=0, 1, ..., 7. Then the vector inner product $\vec{A} \cdot \vec{B} = A_7B_7+A_6B_6+A_5B_5+A_4B_4+A_3B_3+A_2B_2+A_1B_1+A_0B_0$.

Figure 21:
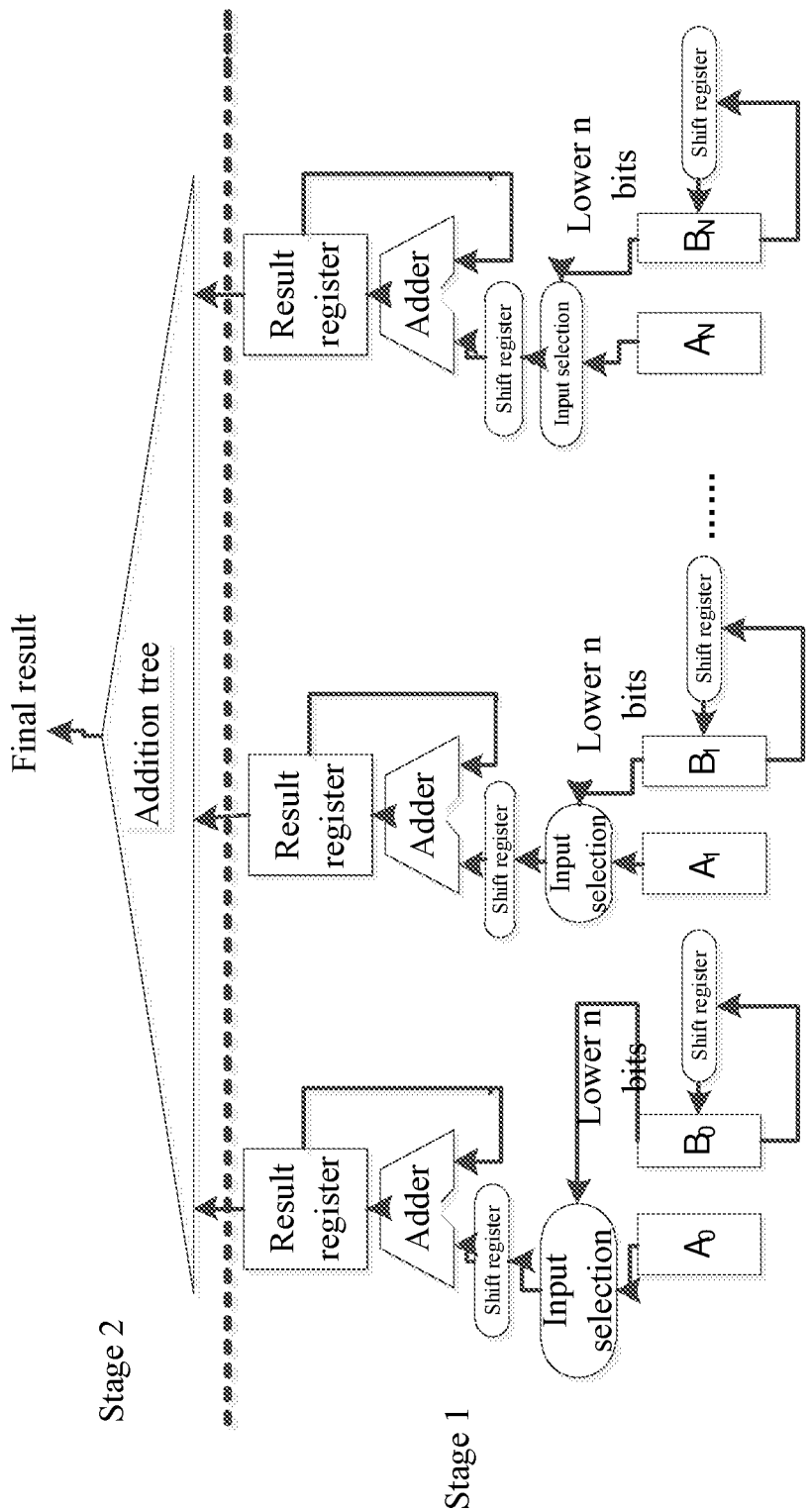
FIG. 21 is a structural schematic diagram of a device for performing vector multiplication by a basic multiplier or a sparse multiplier provided in an embodiment of the present disclosure.

The operation flow using the basic multiplier or the above-described basic or sparse multiplier (assuming that n is 2, that is, the multiplier is shifted by 2 bits each time) is divided into two stages: at first, the products of respective components are calculated separately, and then they are subject to summation, as shown in FIG. 21. Specifically, for operation of Ai and Bi in a certain dimension, the shift register is cleared. In the first clock cycle, the lowest two bits bi0 and bi1 of Bi are taken, subject to input selection and shifting and are added to an adder, to obtain a value of $Ai*b_{i0}b_{i1}$, and the shift register is added by 2; in the second clock cycle, Bi is shifted to the right by 2 bits, and the lowest two bits are taken to obtain the lowest bits $b_{i2}$, $b_{i3}$, which are subject to input selection and shifting to obtain $Ai*b_{i2}b_{i3}$; this result is added to the previous product to obtain the final operation result $Ai*b_{i0}b_{i1}b_{i2}b_{i3}$, that is, the final operation result $Ai*Bi$ of this dimension is obtained. Operation of the next dimension is performed. $A_{i+1}$ and $B_{i+1}$ are input, and the shift register is cleared . . . until the operation of each dimension is completed, to obtain ($A_0*B_0$, $A_1*B_1$, . . . , $A_7*B_7$). The operation in stage 1 is completed. Then, in stage 2, the products are sent to an addition tree for addition, to obtain the final result of the vector inner products, i.e., $\vec{A} \cdot \vec{B}$. In stage 1, one multiplier can be selected to calculate each dimension in turn; multiple multiplier may also be provided to carry out parallel operation and complete operation of one dimension in one multiplier, as shown in FIG. 11 and FIG. 7. When multiple multiplier are used, the shift value for the multiplier $B_i$ in each dimension needs to be recounted. The multiplier at this stage may employ the basic multiplier or the sparse multiplier described above.

A fused vector multiplier is used to perform an overall lateral accumulation operation, and the structure thereof is as shown in FIG. 22. After the product of one component of each dimension is calculated, it is sent to the addition tree for accumulation, until the operation is completed, and the final result is obtained. For instance, the operation flow is as shown in the elliptical box of FIG. 23. In the first clock cycle, the product of $A_i*b_{i0}$ (i=0, 1, . . . , 7) is obtained by calculation for each dimension and sent to the addition tree for accumulation. The calculation result is sent to the result register, and the shift register is added by 1; in the second clock cycle, calculation is performed for each dimension according to the shift register to obtain the product of $2*A_i*b_{i1}$ (i=0, 1, . . . , 7), which is sent to the addition tree for accumulation together with the data in the result register, and the shift register is added by 1; in the third clock cycle, calculation is performed for each dimension according to the shift register to obtain the product of $4*A_i*b_{i2}$ (i=0, 1, . . . , 7), which is sent to the addition tree for accumulation together with the data in the result register, and the shift register is added by 1; finally, in the fourth clock cycle, a product $8*A_i*b_{i3}$ (i=0, 1, . . . , 7) is obtained by calculation, and it is sent to the addition tree for accumulation together with the data in the result register, to obtain the final result. Therefore, the desired result is acquired after 4 operation cycles, and shifting is performed for three times during the operation process. In contrast, for an ordinary multiplier, shifting operation is necessary for the operation of every data, that is, in the case of four operands, a total of 4*3=12 shifting operations are required. Therefore, our design, by changing the order of operations, greatly reduces the counting operation of the shift value and thereby effectively improves the performance-to-power ratio.

Figures 23, 24:
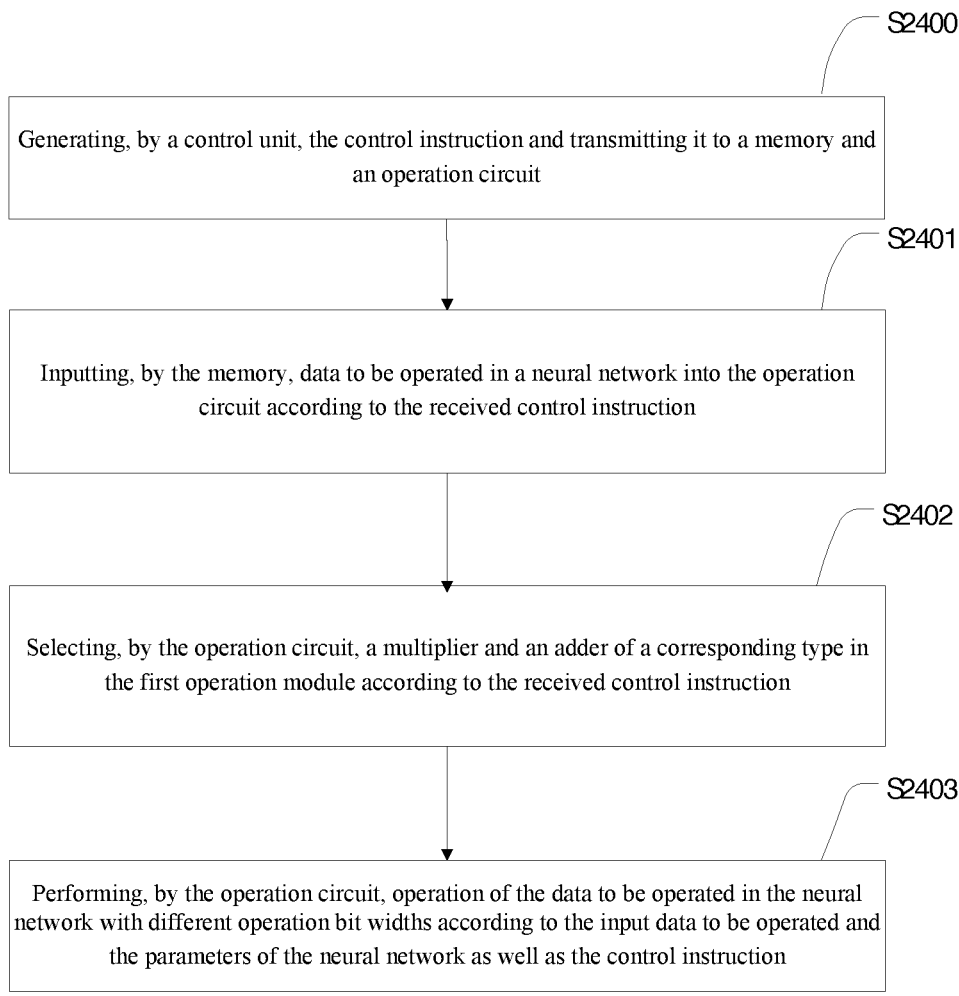
FIG. 23 is a structural schematic diagram of a specific implementation flow of a fused vector multiplier device and other multiplier devices provided by the present disclosure.
FIG. 24 is a flowchart of a processing method with dynamically configurable operation bit width provided by an embodiment of the present disclosure.

According to another aspect of the embodiment of the present disclosure, there is also provided a processing method with dynamically configurable operation bit width, with reference to FIG. 24, which comprises the following steps:

S2400 generating, by a control unit, a control instruction and transmitting it to a memory and an operation circuit;

S2401 inputting, by the memory, data to be operated in a neural network into the operation circuit according to the received control instruction;

S2402 selecting, by the operation circuit, a multiplier and an adder circuit of a corresponding type in the first operation module according to the received control instruction;

S2403 performing, by the operation circuit, operation of the data to be operated in the neural network with different operation bit widths according to the input data to be operated and parameters of the neural network as well as the control instruction.

Furthermore, the first operation module in step S2403 includes performing operation on the data to be operated in the neural network by using an adder, and a basic multiplier, a sparse multiplier, and/or a fused vector multiplier.

To sum up, the processing device and method can significantly improve the operation speed of the neural network, and meanwhile have dynamic configurability, satisfy related requirements of diversity of data bit width and dynamic variability of data bit width in the operation process, and have the advantages of strong flexibility, high configurability, fast operation speed, low power consumption or the like.

Besides, the present disclosure also provides an operation method and an operation device comprising constructing an offline model. After an offline model is generated, the operation can be directly performed according to the offline model, thereby avoiding overhead caused by running the entire software architecture including a deep learning framework. This will be specifically described below in combination with specific embodiments.

Figure 25:
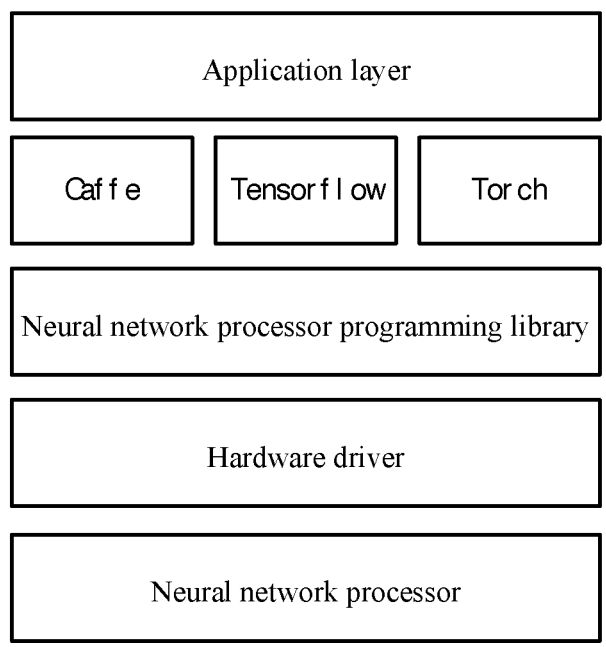
FIG. 25 is a diagram of a typical programming framework.

In typical application scenarios, the neural network accelerator programming framework is usually at the topmost layer, and the programming framework can be Caffe, Tensorflow, Torch, etc. As shown in FIG. 25, from the bottom to the top layer are the neural network processor (hardware special for neural network operation), hardware driver (for software calls to the neural network processor), the neural network processor programming library (for providing an interface to call the neural network processor), the neural network processor programming framework, and advanced applications requiring neural network operations.

An aspect of an embodiment of the present disclosure provides an operation method for a neural network, comprising the following steps:

step 1: acquiring input data;

step 2: acquiring an offline model or determining an offline model based on the input data, and determining an operation instruction according to the offline model for subsequent calculation calls;

step 3: calling the operation instruction, and operating the data to be processed to obtain an operation result for output.

the above input data includes data to be processed, network structure and weight data, or the input data includes data to be processed and/or offline model data.

The offline model in step 2 may be existing, or post-constructed based on external data (such as network structure or weight data). The manner of obtaining the operation instruction by setting an offline model can improve the operation process.

The calling operation instruction in step 3 may be that the network operation is performed only according to the operation instruction, in the case that the input data includes only the data to be processed and does not include the offline model or the data used to determine the offline model.

In some embodiments, when the input data includes data to be processed, network structure, and weight data, the following steps are executed:

step 11: obtaining input data;

step 12: construct an offline model according to the network structure and the weight data;

step 13: parsing the offline model, obtaining and buffering an operation instruction for subsequent calculation call;

step 14: performing operation of the data to be processed according to the operation instruction to obtain an operation result for output.

In the above embodiment, the offline model is first constructed according to the network structure and the weight data, and then the offline model polarity is parsed to obtain the operation instruction, which enables full performance and more concise and fast operation process in a low-memory and real-time application environment where no offline model is stored.

In some embodiments, when the input data includes data to be processed and an offline model, the following steps are executed:

step 21: obtaining input data;

step 22: parsing the offline model, obtaining an operation instruction and buffering it for subsequent calculation call;

step 23: performing operation of the data to be processed according to the operation instruction to obtain an operation result for output.

In the above-mentioned embodiment, when the input data includes an offline model, after the offline model is constructed, the offline model is parsed upon operation to obtain the operation instruction, thereby avoiding the overhead caused by running the entire software architecture including a deep learning framework.

In some embodiments, when the input data includes only data to be processed, the following steps are executed:

step 31: obtaining input data;

step 32: calling a buffered operation instruction and performing operation on the data to be processed to obtain an operation result for output.

In the above-mentioned embodiment, when the input data includes only data to be processed and does not include neural network structure and weight data, the data to be processed is operated by calling the operation instruction to obtain an operation result.

In some embodiments, a neural network processor performs operation on the data to be processed according to the operation instruction to obtain an operation result. The neural network processor is mainly used for neural network operation, and it performs operation after receiving instructions, the data to be processed, and/or a network model (e.g., an offline model); for example, for a multi-layer neural network, operation is performed based on the input-layer data and data of neurons, weights and offsets to obtain output-layer data.

In a further embodiment, the neural network processor has an instruction buffer unit for buffering the received operation instruction.

In some embodiments, the neural network processor further has a data buffer unit for buffering the data to be processed. The data to be processed is input to the neural network processor and temporarily stored in the data buffer unit, and it is later subject to operation according to the operation instruction.

According to the above-mentioned operation method, the embodiment of the present disclosure also provides an operation device comprising:

an input module, configured to acquire input data, wherein the input data includes data to be processed, a network structure and weight data, or the input data includes data to be processed and/or offline model data;

a model generation module, configured to construct an offline model according to the input network structure and weight data;

a neural network operation module, configured to generate an operation instruction and buffer it based on the offline model data in the input module or the offline model constructed in the model generation module, and compute the data to be processed based on the operation instruction to obtain an operation result;

an output module, configured to output the operation result;

a control module, configured to detect the type of the input data and execute the following operations:

where the input data includes the data to be processed, a network structure, and weight data, controlling the input module to input the network structure and the weight data into the model generation module to construct an offline model, and controlling the neural network operation module to perform operation on the data to be processed input by the input module, based on the offline model input by the model generation module;

where the input data includes the data to be processed and an offline model, controlling the input module to input the data to be processed and the offline model into the neural network operation module, and controlling the neural network operation module to generate an operation instruction based on the offline model and buffer the operation instruction, and to perform operation on the data to be processed based on the operation instruction;

where the input data includes only the data to be processed, controlling the input module to input the data to be processed into the neural network operation module, and controlling the neural network operation module to call the buffered operation instruction and perform operation on the data to be processed.

The above neural network operation module includes a model parsing unit and a neural network processor, wherein:

the model parsing unit is configured to generate an operation instruction based on the offline model;

the neural network processor is configured to buffer the operation instruction for subsequent calculation call; or call a buffered operation instruction where only the data to be processed is included in the input data, and perform operation on the data to be processed based on the operation instruction to obtain an operation result.

In some embodiments, the aforesaid neural network processor has an instruction buffer unit for buffering the operation instructions for subsequent calculation calls.

In some embodiments, the aforesaid offline model may be a text file defined according to a special structure, and may be various neural network models, such as Cambricon_model, AlexNet_model, GoogleNet_model, VGG_model, R-CNN_model, GAN_model, LSTM_model, RNN_model, ResNet_model, but are not limited to these models proposed in this embodiment.

The offline model may include necessary network structure information of respective computing nodes in an original network, such as network weights and instruction data, wherein the instruction may include the information of calculation attributes of the respective computing nodes and connection relationships among the computing nodes, so that the offline model corresponding to the network can be directly run when the original network is run by the processor once again, without the need of compiling the same network once again, thereby shortening the time when the processor runs the network and improving the processing efficiency of the processor.

Optionally, the processor may be a general-purpose processor, such as a CPU (Central Processing Unit), a GPU (Graphics Processing Unit), or an IPU (Intelligence Processing Unit), and the IPU is a processor used for performing artificial neural network operation.

In some embodiments, the data to be processed is an input that can be processed with a neural network, such as at least one of continuous single pictures, voice, or video stream.

In some embodiments, the aforesaid network structure may be various neural network structures, such as Alex Net, Google Net, ResNet, VGG, R-CNN, GAN, LSTM, RNN, ResNet, etc., but are not limited to these structures proposed in this embodiment. It should be noted that the network structure here corresponds to the offline model. For instance, when the network structure is RNN, the offline model is RNN_model, and this model comprises necessary RNN network structure information such as network weight value and instruction data of each node in the RNN network, wherein the instruction may include the information of calculation attributes of the respective computing nodes and connection relationships among the computing nodes.

Specifically, depending on the different data input by the input module, the operation device of the embodiment of the present disclosure may have the following three forms of execution.

1. Where the data input by the input module is a network structure, weight data and data to be processed, a control module controls the input module to transmit the network structure and the weight data to a model generation module, and transmits the data to be processed to a model parsing module; the control module controls the model generation module to generate an offline model (the offline model may be a text file defined according to a preset structure, and may include necessary network structure information of respective computing nodes in the neural network such as network weights and instruction data, wherein the instruction may include the information of calculation attributes of the respective computing nodes and connection relationships among the computing nodes; for example, the offline model may be constructed based on the corresponding network structure type and weight data) based on the specific network structure and corresponding weight data, and transmits the generated offline model to the model parsing unit; the control module controls the model parsing unit to parse the received offline model to obtain an operation instruction recognizable by the neural network processor (that is, to map a corresponding network operation instruction according to the text file of the offline model, without performing network compiling operation), and transmits the operation instruction and the data to be processed to a neural network processor; the neural network processor performs operation on the data to be processed according to the received operation instruction to obtain the operation result, and transmits the operation result to an output module for output.

2. Where the data input by the input module is the offline model and the data to be processed, the control module controls the input module to directly transmit the offline model and the data to be processed to a model parsing unit, and the principle of the subsequent work is the same as the first circumstance.

3. Where the data input by the input module includes only the data to be processed, the control module controls the input module to transmit the data to be processed to a neural network processor via a model parsing unit, and the neural network processor performs operation on the data to be processed according to a buffered operation instruction to obtain an operation result. The input module may include a determination module for determining the type of the input data. It can be understood that this circumstance usually does not occur in the first-time use of the neural network processor to ensure that there are certain operation instructions in the instruction buffer.

Therefore, when the offline model of the current network operation is different from that of the previous network operation, the data input by the input module should include network structure, weight data, and the data to be processed, and the subsequent network operation is performed after a new offline model is generated by the model generation module; when a corresponding offline model has been obtained in advance for the current network operation, the data input by the input module should include the offline model and the data to be processed; when the offline model of the current network operation is the same as that of the previous network operation, the data input by the input module may include only the data to be processed.

In some embodiments of the present disclosure, the operation device described in the present disclosure is integrated as a sub-module into a central processor module of the entire computer system. The data to be processed and the offline model are transmitted to the operation device under the control of the central processor. The model parsing unit parses the transmitted neural network offline model and generates an operation instruction. Then, the operation instruction and the data to be processed are transmitted to the neural network processor to undergo operation processing, to obtain an operation result, which is returned to a main storage unit. In the subsequent operation process, the network structure is no longer changed, so it is merely necessary to continuously transmit the data to be processed to complete the neural network operation, and obtain operation results.

The operation device and method proposed by the present disclosure will be described in detail below through specific embodiments.

Figure 26:
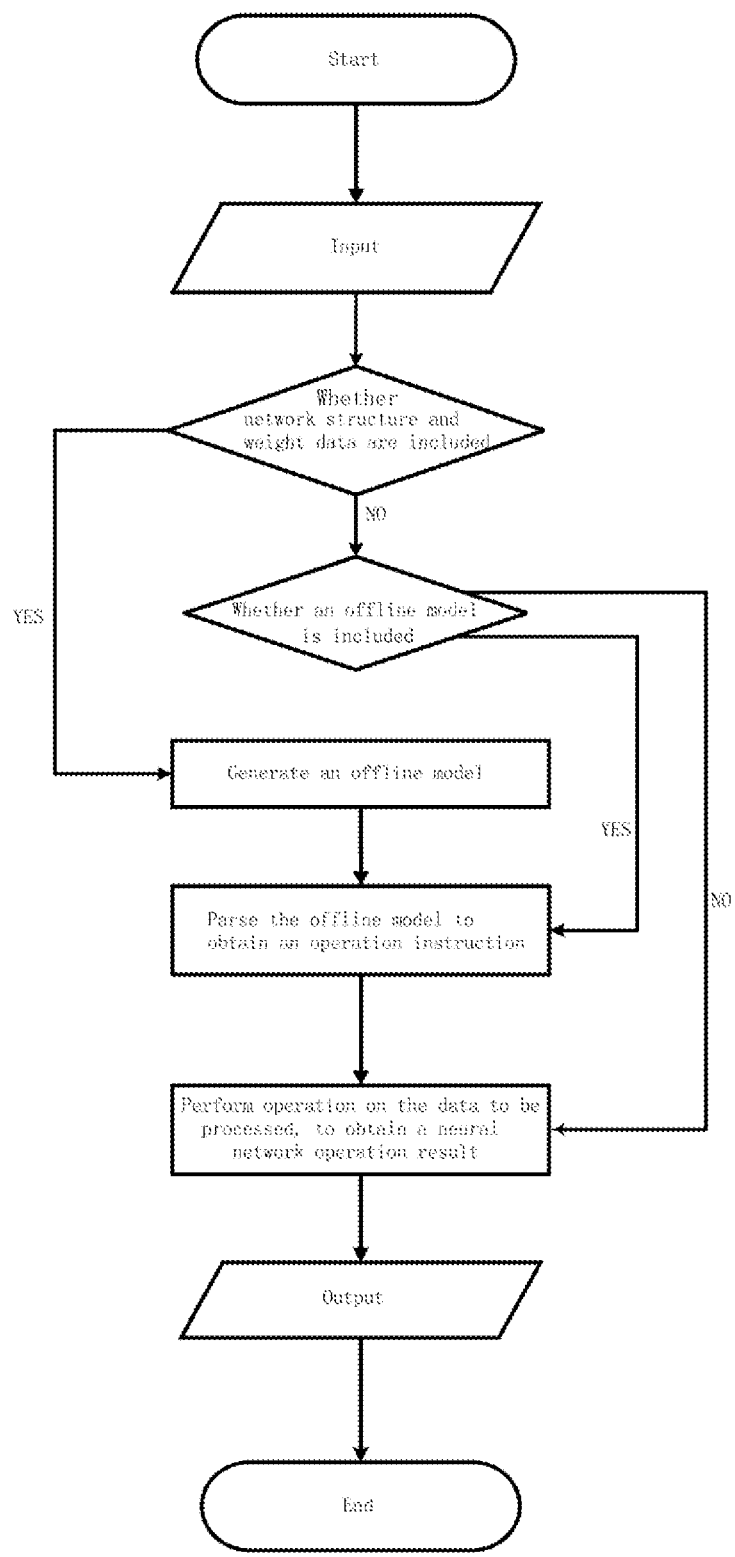
FIG. 26 is an operation flowchart of an operation method according to an embodiment of the present disclosure.

As shown by FIG. 26, the embodiment proposes an operation method, comprising steps of:

when the input data includes data to be processed, network structure, and weight data, the following steps are executed:

step 11: obtaining input data;

step 12: construct an offline model according to the network structure and the weight data;

step 13: parsing the offline model, obtaining an operation instruction and buffering it for the subsequent calculation call;

step 14: performing operation of the data to be processed according to the operation instruction to obtain an operation result for output;

when the input data includes data to be processed and an offline model, the following steps are executed:

step 21: obtaining input data;

step 22: parsing the offline model, obtaining an operation instruction and buffering it for subsequent calculation call;

step 23: performing operation of the data to be processed according to the operation instruction to obtain an operation result for output;

when the input data includes only data to be processed, the following steps are executed:

step 31: obtaining input data;

step 32: calling a buffered operation instruction and performing operation on the data to be processed to obtain an operation result for output.

A neural network processor performs operation on the data to be processed according to the operation instruction to obtain an operation result; the neural network processor has an instruction buffer unit and a data buffer unit for buffering a received operation instruction and the data to be processed.

The input network structure proposed in this embodiment is AlexNet, the weight data is bvlc_alexnet.caffemodel, the data to be processed is continuous single pictures, and the offline model is Cambricon_model. For the existing offline model, the offline model Cambricon_model can be parsed to generate a series of operation instructions, and then the generated operation instructions are transmitted to an instruction buffer unit on a neural network processor 2707, and an input picture transmitted by an input module 2701 is transmitted to a data buffer unit on the neural network processor 2707.

In conclusion, by using the method proposed in this embodiment, the operation process using the neural network processor can be greatly simplified, and the extra memory and IO overhead incurred by calling a traditional whole programming framework can be avoided. By using this method, the neural network accelerator can fully exert the computing performance in a low-memory and real-time environment.

Figure 27:
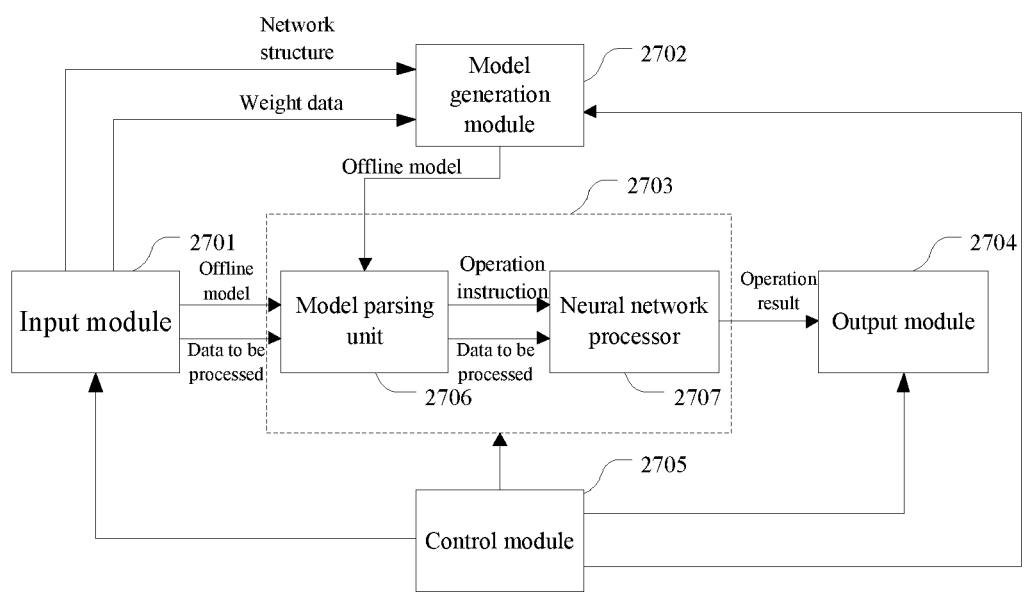
FIG. 27 is a structural block diagram of an operation device according to another embodiment of the present disclosure.

As shown by FIG. 27, this embodiment further provides an operation device, comprising: an input module 2701, a model generation module 2702, a neural network operation module 2703, an output module 2704, and a control module 2705, wherein the neural network operation module 2703 comprises a model parsing unit 2706 and a neural network processor 2707.

The keyword of the device includes offline execution, which means that after the offline model is generated, the offline model is directly used to generate a relevant operation instruction and the weight data is transmitted, to perform operation on the data to be processed. More specifically:

the input module 2701 is configured to input a combination of a network structure, weight data, and data to be processed or a combination of an offline model and data to be processed. When the input is the network structure, the weight data, and the data to be processed, the network structure and weight data are transmitted to the model generation module 2702 to generate an offline model for performing subsequent operations. When the input is the offline model and the data to be processed, the offline model and the to-be-processed data are directly transmitted to the model parsing unit 2706 to perform subsequent operations.

The output module 2704 is configured to output the determined operation data generated according to a specific network structure and a set of data to be processed, wherein the output data is obtained from operation by the neural network processor 2707.

The model generation module 2702 is configured to generate an offline model for use by a lower layer according to the input network structure parameter and the weight data.

The model parsing unit 2706 is configured to parse the transmitted-in offline model, generate an operation instruction that can be directly transmitted to the neural network processor 2707, and meanwhile transmit the data to be processed input from the input module 2701 to the neural network processor 2707.

The neural network processor 2707 is configured to perform the operation according to the transmitted-in operation instruction and the data to be processed, and transmit the determined operation result to the output module 2704, and the neural network processor 2707 has an instruction buffer unit and a data buffer unit.

The above control module 2705 is configured to detect the input data type and execute the following operations:

where the input data includes the data to be processed, a network structure, and weight data, controlling the input module 2701 to input the network structure and the weight data into the model generation module 2702 to construct an offline model, and controlling the neural network operation module 2703 to perform neural network operation on the data to be processed input from the input module 2701, based on the offline model input from the model generation module 2702;

where the input data includes the data to be processed and an offline model, controlling the input module 2701 to input the data to be processed and the offline model into the neural network operation module 2703, and controlling the neural network operation module 2703 to generate an operation instruction and buffer it based on the offline model, and to perform neural network operation on the data to be processed based on the operation instruction;

where the input data includes only the data to be processed, controlling the input module 2701 to input the data to be processed into the neural network operation module 2703, and controlling the neural network operation module 2703 to call the buffered operation instruction and perform neural network operation on the data to be processed.

The input network structure proposed in this embodiment is AlexNet, the weight data is bvlc_alexnet.caffemodel, and the data to be processed is continuous single pictures. The model generation module 2702 generates a new offline model Cambricon_model based on the input network structure and the weight data. The generated offline model Cambricon_model may be used alone as the next input; the model parsing unit 2706 can parse the offline model Cambricon_model to generate a series of operation instructions. The model parsing unit 2706 transmits the generated operation instructions to an instruction buffer unit on the neural network processor 2707, and transmits an input picture transmitted from an input module 2701 to a data buffer unit on the neural network processor 2707.

Besides, the present disclosure also provides an operation device and an operation method supporting the composite scalar instruction. By providing composite scalar instructions (instructions that unify a floating point instruction and a fixed point instruction) in the operation, the floating point instruction and the fixed point instruction are unified to a large extent, so that the type of the instruction is not distinguished in the decoding stage, and it is determined whether the operand is floating point data or fixed point data according to the address in the address field of the operand upon specific operation, which simplifies the decoding logic of the instruction and also simplifies the instruction set. This is demonstrated in detail below with reference to specific embodiments.

Figure 28:
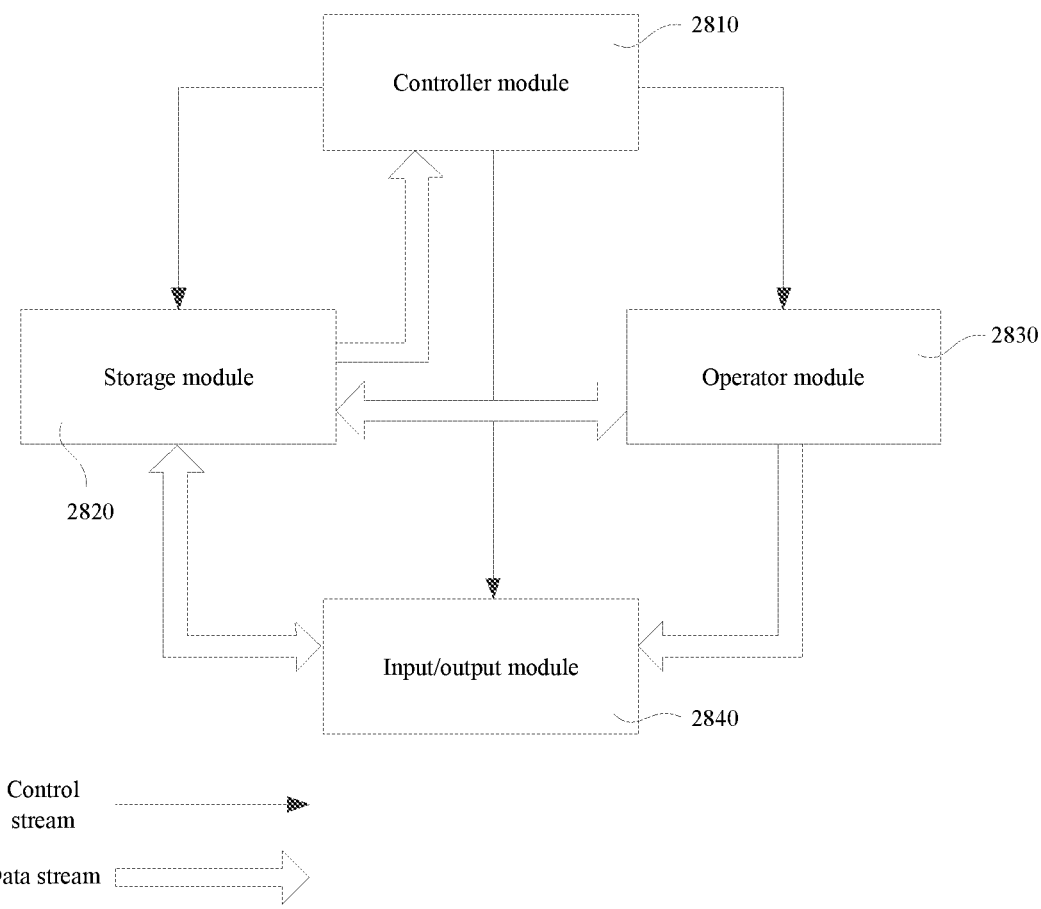
FIG. 28 is a structural schematic diagram of an operation device according to an embodiment of the present disclosure.

FIG. 28 is a schematic diagram of a device supporting the composite scalar instruction provided by an embodiment of the present disclosure. As shown by FIG. 28, the device comprises a controller module 2810, a storage module 2820, an operator module 2830, and an input/output module 2840.

The controller module 2810 is configured to read an instruction from the storage module and store it in a local instruction queue, and then decode the instruction in the instruction queue into a control signal to control behavior of the storage module, the operator module, and the input/output module.

The storage module 2820 includes storage devices such as a register file, a RAM, and a ROM for storing different data such as instructions and operands. The operands include floating point data and fixed point data. The storage module stores the floating point data and the fixed point data in spaces corresponding to different addresses, for example, different RAM addresses or different register numbers, so that it can be determined whether the read data is a floating point or a fixed point data based on the address and the register number.

The operator module 2830 can perform operations such as four arithmetic operations, logical operation, shift operation, and complement operation on the floating point data and the fixed point data, wherein the four arithmetic operations include the four operations of addition, subtraction, multiplication, and division; the logical operation includes four operations of AND, OR, NOT, and XOR. After receiving the control signal of the controller module, the operator module can determine whether the read data is data of a floating point type or data of a fixed point type by reading an address or a register number where the operand is located, the operator module reads the data to be operated from the storage module and performs corresponding operation, the intermediate result of the operation is stored in the storage module, and the final operation result is stored in the input/output module.

The input/output module 2840 can be used for storing and transmitting input and output data. During initialization, the input/output module stores the initial input data and a compiled composite scalar instruction into the storage module, and receives the final operation result transmitted from the operator module after the operation ends. Besides, the input/output module can also read information required by compiling the instruction from the memory for the computer compiler to compile a program into various instructions.

It can be seen that the device supporting composite scalar instruction provided by the embodiment of the present disclosure provides an efficient execution environment for the composite scalar instruction.

Figure 29A:
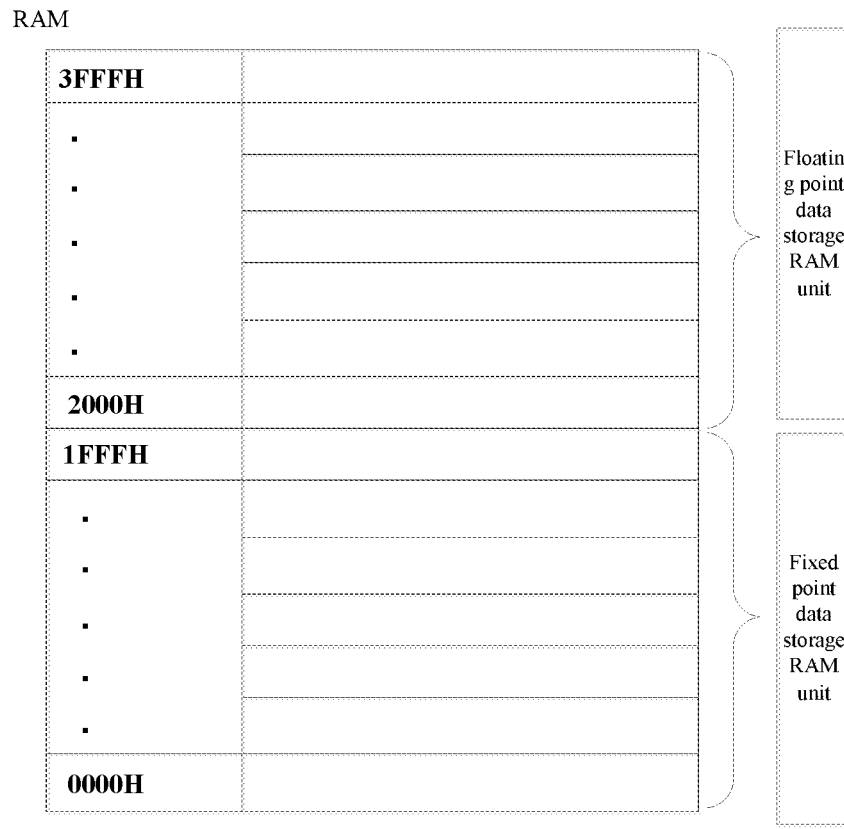
FIG. 29A is an exemplary diagram showing an organization form of a storage module RAM provided in an embodiment of the present disclosure.
Figure 29B:
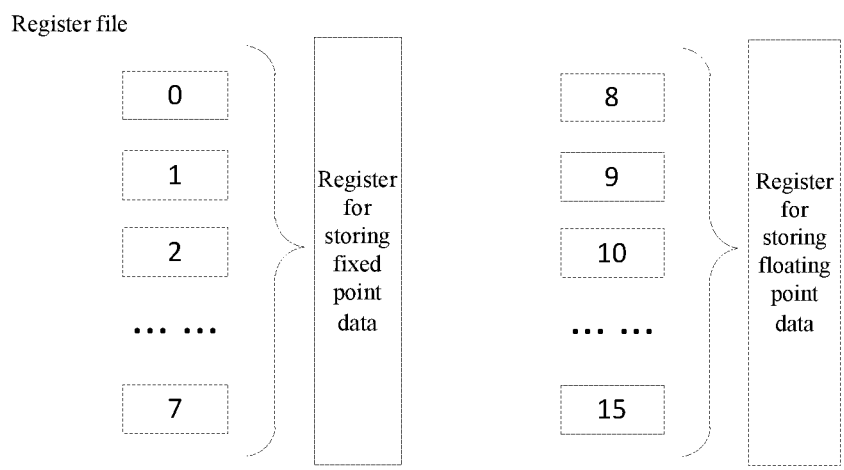
FIG. 29B is an exemplary diagram showing an organization form of a storage module register file provided in an embodiment of the present disclosure.

FIG. 29A and FIG. 29B are diagrams showing organization forms of a storage module provided in an embodiment of the present disclosure. The storage module stores floating point data and fixed point data in different address spaces, such as different addresses or different register numbers, so that it can be determined whether the read data is a floating point number or a fixed point number based on the address and register number.

In this embodiment, the present disclosure shows how to separate the storage of floating point numbers from the storage of fixed point numbers by using, as an example, a storage module, including a RAM having a start address of 0000H and a termination address of 3FFFH, and a register file consisting of 16 registers. As shown in FIG. 29A, in the RAM, the fixed point data is stored only in the RAM units of the address 0000H to 1FFFH, and the floating point data is stored only in the RAM units of 2000H to 3FFFH, and the instruction can be stored in any RAM unit, also the changeless information in the instruction set can be stored in a ROM. As shown in FIG. 29B, in the register file, fixed-point data exists only in registers 0 to 7, and floating-point data exists only in registers 8 to 15. When the value stored in the register is the RAM address, registers 0 to 7 are used to store the RAM address of the fixed point data, and registers 8 to 15 are used to store the RAM address of the floating point data.

FIG. 30A is a diagram of a composite scalar instruction provided in an embodiment of the present disclosure. As shown in FIG. 30A, each instruction has an opcode field, an operand address field (or immediate operand) and a target address field. The opcode field includes opcodes, and the operand address field includes a source operand reference 1 and a source operand reference 2, representing the storage address of each source operand, and the target address field is the storage address of the operand operation result.

The opcode field is used to distinguish operations of different types, such as addition, subtraction, multiplication, and division, but is not used to distinguish the type of operand.

The operand address field may contain a RAM address, a register number, and an immediate operand. The RAM address and the register number used to store floating-point data and fixed-point data are different, so the address field can be used to distinguish floating-point operands and fixed-point operands. When the operand address field stores an immediate operand, a data type flag bit recognizable by the operator module is also needed to distinguish the floating point operands from the fixed point operands.

The target address field can be either a RAM address or a register number. The address field should correspond to the operand type, i.e., the operation result of the floating point operand is stored in a storage unit corresponding to the floating point data; the operation result of the fixed-point operand is stored in a storage unit corresponding to the fixed-point data.

In view of the foregoing, the composite scalar instruction provided by the present disclosure is an instruction that unifies the floating point instruction and the fixed point instruction, and it unifies the floating point instruction and the fixed point instruction to a large extent, so that the type of the instruction is not distinguished in the decoding stage, and it is determined whether the operand is floating point data or fixed point data according to the address of the read operand in the operand address field upon specific operation, which simplifies the decoding logic of the instruction and also simplifies the instruction set.

Besides, for the composite scalar instruction provided by the present disclosure, if multiple addressing modes are used, it is also necessary to increase a flag bit for determining the addressing mode.

For example, when the organization forms of a storage module shown in FIGS. 29A and 29B are used, the opcode of the addition instruction is 0001; when multiple addressing modes are used, the composition of the composite scalar instruction is as shown in FIG. 30B to FIG. 30E.

FIG. 30B is an exemplary diagram of a composite scalar instruction when register addressing is used provided by the embodiment of the present disclosure. As shown in FIG. 30B, when register addressing is used, the addressing mode flag bit is 01, source operand 1 and source operand 2 are stored respectively in the registers corresponding to the register numbers of source operand 1 and source operand 2, fixed point data is stored in registers numbered 0 to 7, and floating point data is stored in registers numbered 8 to 15.

FIG. 30C is an exemplary diagram of a composite scalar instruction when register indirect addressing is used, provided in an embodiment of the present disclosure. As shown in FIG. 30C, when register indirect addressing is used, the addressing mode flag bit is 10, and addresses of the source operand 1 and source operand 2 in the RAM are stored respectively in registers corresponding to the register numbers of source operand 1 and source operand 2, wherein the RAM addresses of the fixed point data (0000H to 1FFFH) are stored in registers numbered 0 to 7, and the RAM addresses of floating point data (2000H to 3FFFH) are stored in registers numbered 8 to 15. The target address field stores target register numbers or target RAM addresses. The fixed point data is stored in a RAM unit having an address in the range of 0000H to 1FFFH; the floating point data is stored in a RAM unit having an address in the range of 2000H to 3FFFH.

FIG. 30D is an exemplary diagram of a composite scalar instruction when immediate operand addressing is used, provided in an embodiment of the present disclosure. As shown by FIG. 30D, if the data in the operand address fields are two immediate operands, the addressing mode flag bit is 00, and a data type flag bit is also set between the addressing mode flag bit and the operand address field. When the immediate operand is a fixed point type, the data type flag bit is 0; when the immediate operand is a floating point type, the data type flag bit is 1.

FIG. 30E is an exemplary diagram of a composite scalar instruction when RAM addressing is used, provided in an embodiment of the present disclosure. As shown by FIG. 30E, if the operand address field is a RAM address, the addressing mode flag bit is 11. The source operand 1 and the source operand 2 exist respectively in the RAM units corresponding to the RAM addresses. Among them the fixed point data exists in the RAM units corresponding to the RAM addresses 0000H to 1FFFH; the floating point data exists in RAM units corresponding to the RAM addresses 2000H to 3FFFH.

In the related instructions using the above addressing modes, the target address field stores the target register number or the target RAM address. The fixed point data is stored in registers numbered 0 to 7 or in RAM units with addresses ranging from 0000H to 1FFFH; the floating point data is stored in registers numbered 8 to 15 or in RAM units with addresses ranging from 2000H to 3FFFH.

Figure 31:
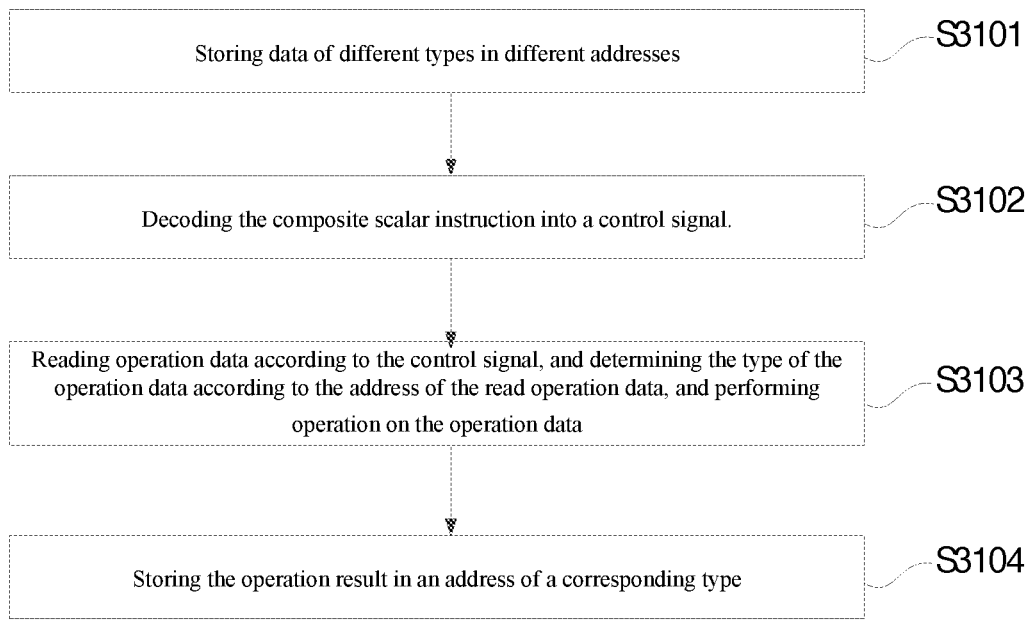
FIG. 31 is a flowchart of an operation method which supports composite scalar instructions provided in an embodiment of the present disclosure.

FIG. 31 is a flowchart of an operation method for supporting a composite scalar instruction provided in an embodiment of the present disclosure. As shown by FIG. 31, the embodiment of the present disclosure provides an operation method for supporting the composite scalar instruction, which performs data operation by using the above-described device supporting a composite scalar instruction, which specifically comprises the following steps:

S3101: storing data of different types in different addresses.

The storage module stores the floating point data and the fixed point data in spaces corresponding to different addresses, for example, different RAM addresses or different register numbers.

S3102: decoding the composite scalar instruction into a control signal.

The controller module sends an input/output (IO) instruction to the storage module, reads the composite scalar instruction from the storage module, and stores it in a local instruction queue. The controller module reads the composite scalar instruction from the local instruction queue and decodes it into a control signal.

S3103: reading operation data according to the control signal, and determining the type of the operation data according to the address of the read operation data, and performing operation on the operation data.

After receiving the control signal from the controller module, the operator module can determine whether the read data is floating point type data or fixed point type data by reading the operand address field. If the operand is an immediate operand, the type of the operand is determined and operated according to the data type flag bit; if the operand comes from the RAM or register, the type of the operand is determined according to the RAM address or the register number, and the operand is read from the storage module to undergo corresponding operation.

S3104: storing the operation result in an address of a corresponding type.

The controller module sends an IO instruction to the operator module, and the operator module transmits the operation result to the storage module or the input/output module.

As can be seen from the above embodiment, the method for executing the composite scalar instruction provided by the present disclosure can execute the composite scalar instruction accurately and efficiently. The provided device supporting the composite scalar instruction provides an efficient execution environment for the composite scalar instruction; the provided method for executing the composite scalar instruction can execute the composite scalar instruction accurately and efficiently.

Furthermore, the present disclosure also provides a counting device and a counting method for supporting counting instructions. By writing an algorithm of counting the number of elements that satisfy a given condition in the input data (data to be counted) into an instruction form, the calculation efficiency can be improved. This will be specifically explained in combination with specific embodiment below.

Figure 32:
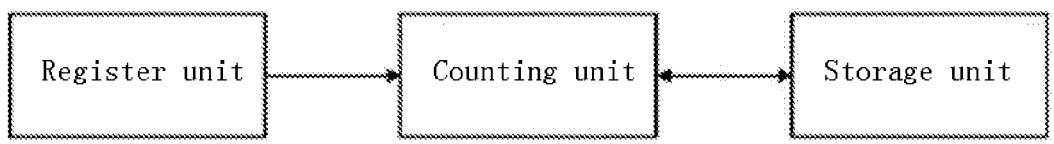
FIG. 32 is a structural schematic diagram of a framework of a counting device according to an embodiment of the present disclosure.

An exemplary embodiment of the present disclosure provides a counting device supporting a counting instruction. FIG. 32 is a schematic diagram of a framework of a counting device according to the embodiment of the present disclosure. As shown by FIG. 32, the counting device supporting a counting instruction according to the present disclosure comprises: a storage unit, a counting unit, and a register unit. The storage unit is connected to the counting unit, and is configured to store the input data to be counted and to store the number of elements satisfying a given condition in the counted input data (counting result), and the storage unit may be main storage, or may be temporary storage and furthermore may be a cache. By temporarily storing the input data to be counted on the cache, the counting instruction can flexibly and efficiently support data of different widths, thereby improving execution performance.

In one embodiment, the storage unit is a cache, which can support input data of different bit widths and/or input data occupying storage spaces of different sizes, and temporarily store input data to be counted in the cache, so that the counting process can flexibly and effectively support data of different widths. The counting unit is connected to the register unit, and the counting unit is configured to acquire a counting instruction, read the address of the input data in the register unit according to the counting instruction, and then acquire corresponding input data to be counted in the storage unit according to the address of the input data, and statistically count the number of elements in the input data that satisfy a given condition to obtain a final count result, and the count result is stored in the storage unit. The register unit is used to store an address of the input data to be counted as stored in the storage unit. In one embodiment, the address stored by the register unit is the address of the input data to be counted as on the cache.

In some embodiments, the data type of the input data to be counted may be a 0/1 vector, or may be a numeric vector or a matrix. When the number of elements in the input data satisfying the given condition is counted, the condition to be satisfied by the counted element may be being the same as a given element. For example, to count the number of elements x contained in a vector A, x may be the number n, n=0, 1, 2 . . . ; x can also be a vector m, for example m=00, 01, 11 . . . . The condition to be satisfied by the counted element may also be satisfying a given expression. For example, to count the number of elements in a vector B that are greater than a value y, where y may be an integer n, n=0, 1, 2 . . . , and it may also be a floating point number f, f=0.5, 0.6 . . . ; for example, to count the number of elements in a vector C that can be exactly divided by z, where z may be an integer n, n=0, 1, 2 . . . .

Figure 33:
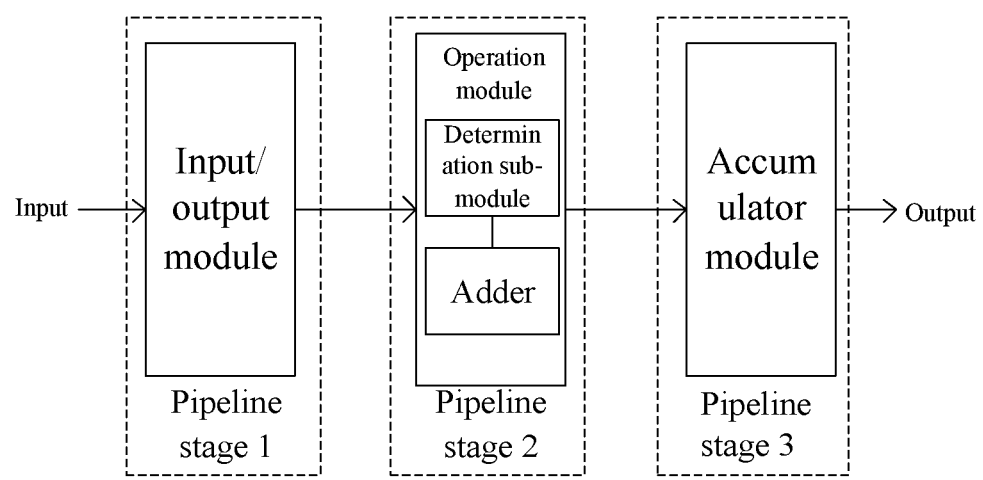
FIG. 33 is a structural schematic diagram of a counting unit in a counting device according to an embodiment of the present disclosure.

FIG. 33 is a schematic diagram of a counting unit in a counting device according to an embodiment of the present disclosure. As shown in FIG. 33, the counting unit comprises an input/output module, an operation module, and an accumulator module.

The input/output module is connected with the operation module, and each time takes a piece of data of a set length (the length can be configured according to actual requirements) of the input data to be counted in the storage unit, and input it to the operation module to undergo operation; after the operation module completes the operation, the input/output module continues to take the next piece of data of a fixed length until all elements of the input data to be counted are taken; the input/output module outputs a count result calculated by the accumulator module to the storage unit.

The operation module is connected to the accumulator module, with a fixed length of data input, adds the number of respective elements of the input data satisfying the given condition by an adder of the operation module, and outputs the obtained result to the accumulator module. The operation module further comprises a determination sub-module for determining whether the input data satisfies a given condition (the given condition may be being the same as a given element, or a value being within a set interval), if satisfied, outputting 1, if not satisfied, outputting 0, and then sending the output to the adder to undergo accumulation.

In an embodiment, the structure of the adder may include n layers, wherein: the first layer has 1 full adders, the second layer has $\lceil 2l/3 \rceil$ full adders, . . . the $m^{th}$ layer has $\lceil 2^{m-1}l/3^{m-1} \rceil$ full adders; wherein l, m, n are integers greater than 1, m is an integer greater than 1 and less than n, and |x| represents that the data x is subjected to a ceiling operation. The specific process is described below. It is assumed that the input data type is a 0/1 vector, and now count the number of 1 in the 0/1 vector to be counted. Assuming a fixed length of 0/1 vector is 3l, wherein l is an integer greater than one. The first layer of the adder has 1 full adders; the second layer of the adder has $\lceil 2l/3 \rceil$ full adders, each full adder having 3 inputs and 2 outputs, then the first layer gets a total of 4l/3 outputs. According to this method, the full adders in each layer have 3 inputs and 2 outputs, and the adders of the same layer can be executed in parallel; if the number of the i-th data is 1 during the calculation, it may be output as the i-th bit of the final result, i.e., the number of 1 in the 0/1 vector of this part.

Figure 34:
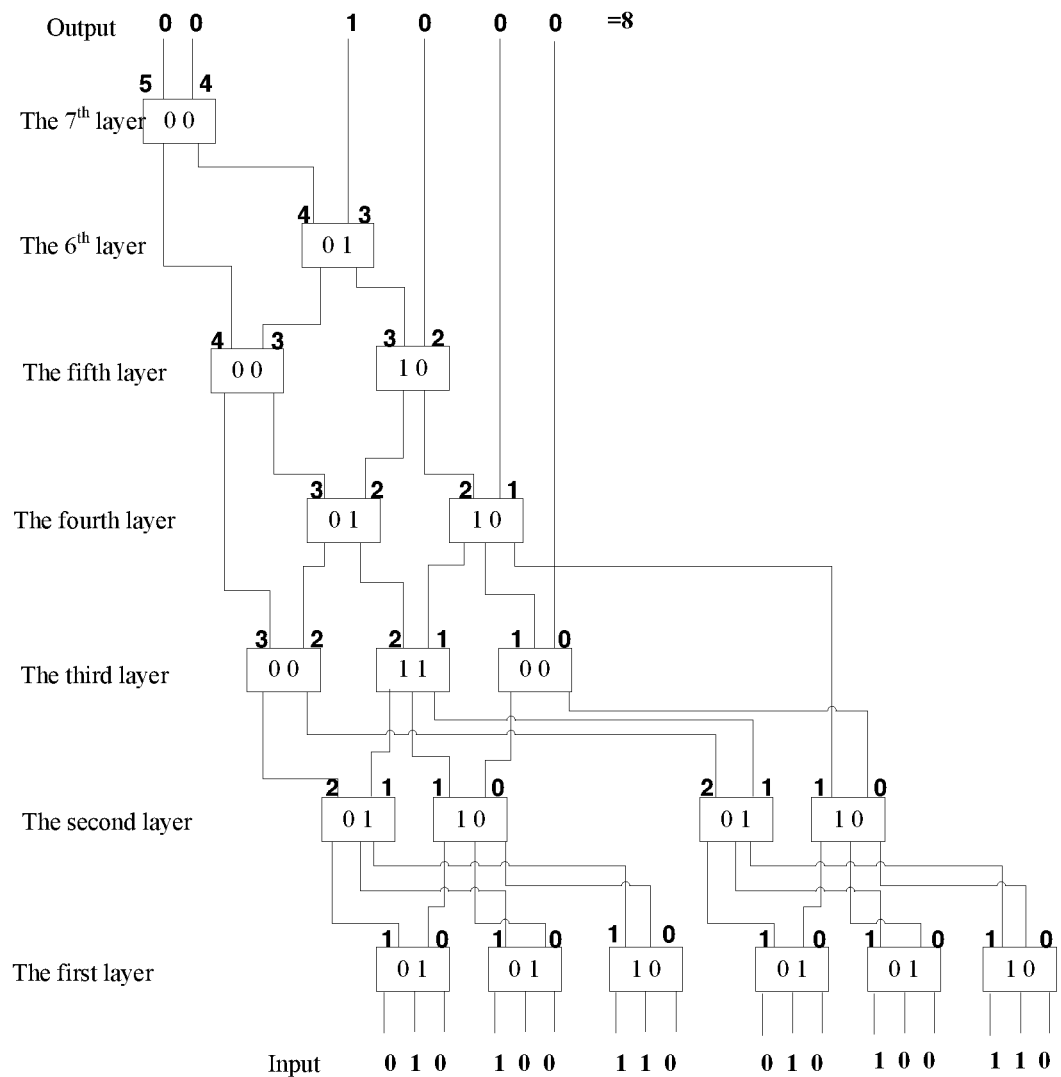
FIG. 34 is a structural schematic diagram of an adder in the counting unit in FIG. 33.

FIG. 34 is a schematic diagram of a specific full adder, wherein the adder structure includes 7 layers (i.e., n is 7); the first layer has 6 full adders, and a piece of fixed length 0/1 vector has a length of 18 (i.e., l is 6), wherein the full adders of each layer can operate in parallel, for example, the $3^{rd}$ layer has $\lceil 2^{m-1}l/3^{m-1} \rceil=3$ (i.e., m is 3, l is 6) full adders; when the input data is (0,1,0), (1,0,0), (1,1, 0), (0, 1, 0), (1, 0, 0), (1, 1, 0), by counting with the full adders of the embodiment of the present disclosure, the result is (001000), that is, 8. The aforesaid adders can increase the parallelism of the addition calculation and effectively improve the operation speed of the operation module.

The accumulator module is further connected to the input/output module, and accumulates the result output from the operation module until there is no new input.

The counting unit is a multi-stage pipeline structure, wherein the operation of reading a vector in the input/output module is at the first pipeline stage, the operation module is at the second pipeline stage, and the accumulator module is at the third pipeline stage. These units are at different pipeline stages and can more efficiently implement the operations required by the counting instruction.

Figure 35:
FIG. 35 is a diagram showing a format of an instruction set of a counting instruction in a counting device according to an embodiment of the present disclosure.

FIG. 35 is a diagram showing a format of an instruction set of a counting instruction in a counting device according to an embodiment of the present disclosure. As shown in FIG. 35, the counting instruction includes an opcode and one or more operation fields, wherein the opcode is used to indicate that the instruction is a counting instruction, and the counting unit can perform a counting operation by identifying the opcode; the operation fields may include address information for indicating the input data to be counted in the counting instruction, and it may further include the address information of a determination condition. The address information may be an immediate operand or a register number. For example, to obtain a vector, the vector start address and the vector length may be obtained in a corresponding register according to the register number, and then a vector stored in a corresponding address in the storage unit is acquired according to the vector start address and the vector length. The instructions adopted by the embodiment of the present disclosure have a compact format, so that the instruction set is convenient to use and supports data of flexible length.

Figure 36:
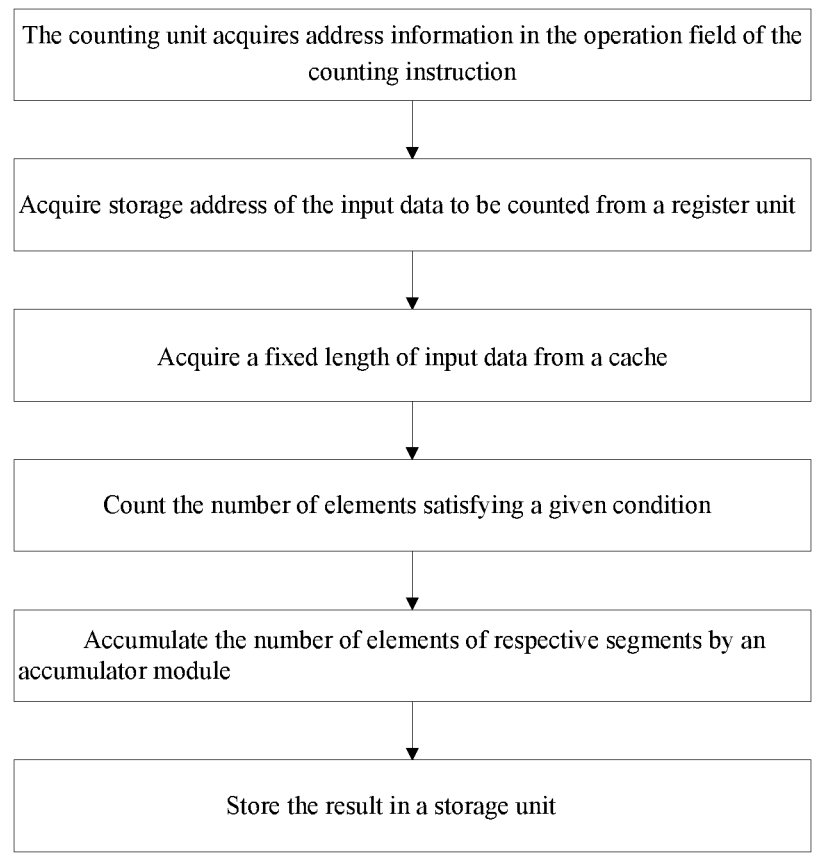
FIG. 36 is a flowchart of an execution process of a counting unit in a counting device according to an embodiment of the present disclosure.

FIG. 36 is a flowchart of an execution process of a counting unit in a counting device according to an embodiment of the present disclosure. As shown in FIG. 36, during operation, the counting unit acquires address of the input data to be counted in the register unit according to the address information in the operation field of the counting instruction, and then acquires the input data to be counted in the storage unit according to the address. The input data to be counted is stored in a cache, the counting unit each time acquires a fixed length of input data from the cache, and a determination sub-module determines whether an element satisfies a given condition, and then an adder is used to count the number of elements satisfying the given condition in this part of input data, and the number of elements satisfying the given condition in each part of data is accumulated by an accumulator module to obtain a final counting result, which is stored in a storage unit.

Figure 37:
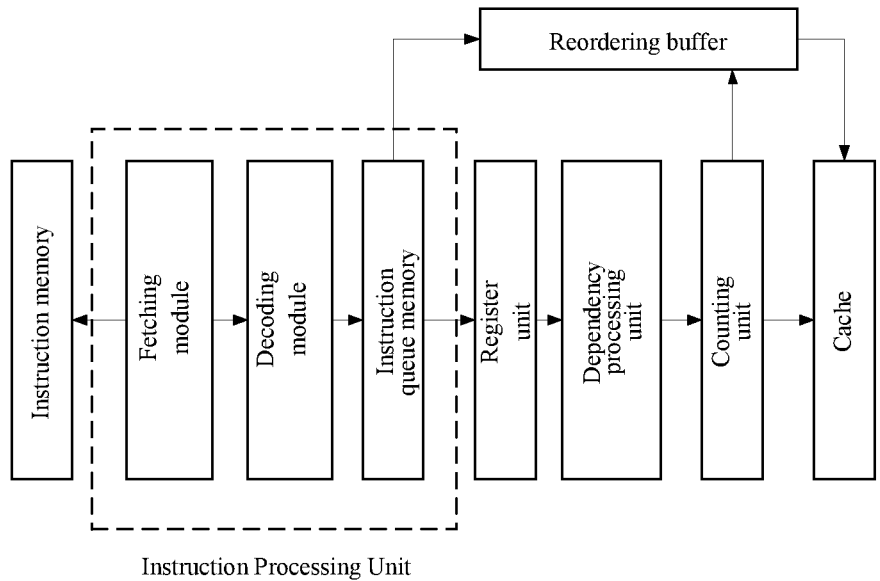
FIG. 37 is a structural schematic diagram of a counting device according to an embodiment of the present disclosure.

FIG. 37 is a schematic diagram of detailed structure of a counting device according to an embodiment of the present disclosure. As shown in FIG. 37, in the present disclosure, the device supporting the counting instruction may further include: an instruction memory, an instruction processing unit, an instruction buffer unit, and a dependency processing unit.

The instruction processing unit is configured to acquire a counting instruction from the instruction memory, and process the counting instruction and provide the processed instruction to the instruction buffer unit and the dependency processing unit. The instruction processing unit comprises: an instruction fetching module and a decoding module. The fetching module is connected to the instruction memory, for acquiring the counting instruction from the instruction memory; the decoding module is connected with the fetching module, for decoding the obtained counting instruction. In addition, the instruction processing unit may further comprise an instruction queue memory, which is connected to the decoding module for sequentially storing the decoded counting instructions, and sequentially transmitting the instructions to the instruction buffer unit and the dependency processing unit. Considering the limited number of instructions that can be accommodated by the instruction buffer unit and the dependency processing unit, the instructions in the instruction queue memory can be sequentially transmitted only when the instruction buffer unit and dependency processing unit have free capacity.

The instruction buffer unit may be connected to the instruction processing unit, for sequentially storing the counting instructions to be executed. The counting instructions are also buffered in the instruction buffer unit during execution. After the execution of an instruction, the instruction execution result (counting result) is transferred to the instruction buffer unit; if the instruction is also the earliest instruction among the uncommitted instructions in the instruction buffer unit, the instruction will be committed, and the instruction execution result (count result) will be written back to the cache together. In one embodiment, the instruction buffer unit may be a reordering buffer.

The dependency processing unit may be connected to the instruction queue memory and the counting unit, for determining whether a vector required for the counting instruction (i.e., the vector to be counted) is up-to-date before the counting unit acquires the counting instruction, and if YES, the counting instruction is directly provided to the counting unit; otherwise, the counting instruction is stored in a storage queue of the dependency processing unit, and after the required vector is updated, the counting instruction in the storage queue is provided to the counting unit. Specifically, when the counting instruction accesses the cache, the storage space is waiting for the writing of the previous instruction; in order to ensure the correctness of the execution result of the instruction, if the current instruction is detected to have a dependency on the data of the previous instruction, the instruction must wait in the storage queue until the dependency is removed. The dependency processing unit enables instructions to be executed out of order and sequentially committed, which effectively reduces pipeline blocking and enables precise exceptions.

The fetching module is responsible for fetching the next instruction to be executed from the instruction memory and transmitting the instruction to the decoding module; the decoding module is responsible for decoding the instruction and transmitting the decoded instruction to the instruction queue memory; the instruction queue memory is used to buffer the decoded instruction, and send the instruction to the instruction buffer unit and the dependency processing unit when the instruction buffer unit and the dependency processing unit have free capacity; during the process that the counting instruction is sent from the instruction queue memory to the dependency processing unit, the counting instruction reads address of the input data in the storage unit from the register unit; the dependency processing unit is used to process a possible data dependent relationship between a current instruction and the previous instruction, and the counting instruction accesses the storage unit, and other previously executed instructions may access the same block of storage. In order to ensure the correctness of the execution result of the instruction, if the current instruction is detected to have a dependency on the data of the previous instruction, the instruction must wait in the storage queue until the dependency is removed. The counting unit acquires a counting instruction from the dependency processing unit, acquires the corresponding input data to be counted in the storage unit according to the address of the input data read from the register unit by the counting instruction, and counts the number of elements satisfying a given condition in the input data, and transmits the counting result to the instruction buffer unit. The final counting result and this counting instruction are written back to the storage unit.

Figure 38:
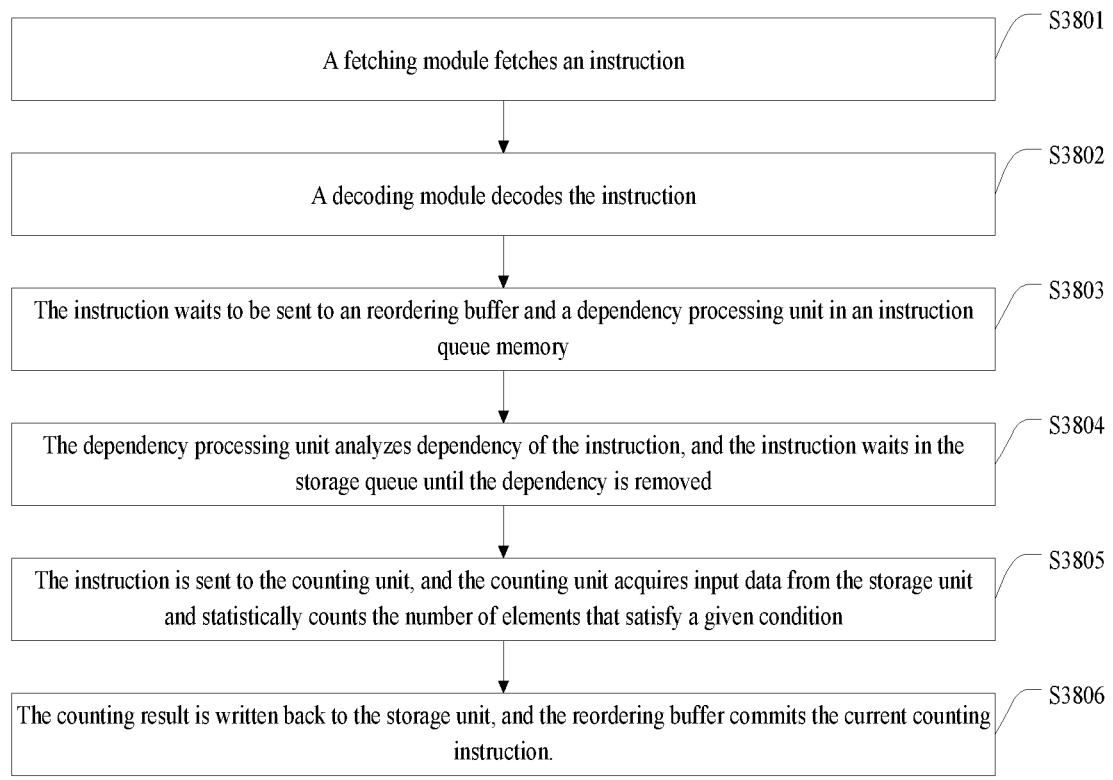
FIG. 38 is a flowchart of an execution process of a counting device according to an embodiment of the present disclosure.

FIG. 38 is a flowchart of an execution process of a counting device according to an embodiment of the present disclosure. As shown by FIG. 38, the process of executing a counting instruction comprises:

S3801: a fetching module fetches a counting instruction from an instruction memory, and sends the counting instruction to a decoding module.

S3802: the decoding module decodes the counting instruction and sends the counting instruction to an instruction queue memory.

S3803: the counting instruction waits in the instruction queue memory, and is sent to an instruction buffer unit and a dependency processing unit when the instruction buffer unit and the dependency processing unit have free capacity.

S3804: during the process that the counting instruction is sent from the instruction queue memory to the dependency processing unit, the counting instruction reads address of the input data in the storage unit from the register unit; the dependency processing unit analyzes whether the instruction has a data dependency with a previous instruction of which the execution has not been finished, and the counting instruction needs to wait in a storage queue of the dependency processing unit until there is no dependency in data between the current instruction and the previous instruction of which the execution has not been finished.

S3805: after the dependency no longer exists, the current counting instruction is sent to the counting unit. The counting unit acquires input data from the storage unit according to the storage address, and statistically counts the number of elements in the input data that satisfy a given condition.

S3806: after the counting is completed, the counting result is written back to the storage unit by the instruction buffer unit, and the instruction buffer unit commits the current counting instruction to the storage unit.

So far, the present embodiment has been described in detail with reference to the drawings. Based on the above description, persons skilled in the art should have a clear understanding of the counting device supporting the counting instruction and the counting method thereof in the embodiment of the present disclosure.

Some embodiments further disclose a chip, which comprises the aforesaid neural network processor, processing device, counting device or operation device.

Some embodiments further disclose a chip package structure, which comprises the aforesaid chip.

Some embodiments further disclose a board, which comprises the aforesaid chip package structure.

In one embodiment, an electronic apparatus is also disclosed that comprises the aforesaid board.

The electronic apparatus may include, but is not limited to, robots, computers, printers, scanners, tablets, smart terminals, mobile phones, driving recorders, navigators, sensors, webcams, cloud servers, cameras, video cameras, projectors, watches, headphones, mobile storage, wearable apparatuses, vehicles, household appliances, and/or medical equipment.

The vehicle may include an airplane, a ship, and/or a car; the household appliance includes a television, an air conditioner, a microwave oven, a refrigerator, a rice cooker, a humidifier, a washing machine, an electric lamp, a gas stove, a range hood; the medical equipment includes a nuclear magnetic resonance instrument, B-ultrasound instrument and/or electrocardiograph.

In the embodiments provided by the present disclosure, it should be understood that the related device and method disclosed may be implemented in other manners. For example, the device embodiments described above are merely illustrative. For instance, the division of the part or module is only a logical function division. In actual implementation, there may be another division manner, for example, multiple parts or modules may be combined or may be integrated into one system, or some features can be ignored or not executed.

In the present disclosure, the term "and/or" may have been used. As used herein, the term "and/or" means one or the other or both (e.g., A and/or B means A or B or both A and B).

In the above description, for purposes of explanation, numerous specific details are set forth in order to provide a thorough understanding of various embodiments of the present disclosure. However, it will be obvious for a person skilled in the art that one or more other embodiments can also be implemented without some of these specific details. The specific embodiments described are not intended to limit the present disclosure but to illustrate it. The scope of the present disclosure is not to be determined by the specific embodiments provided above but only by the following claims. In other instances, known circuits, structures, apparatuses, and operations are shown not in detail but in block diagrams so as not to obscure the understanding of the description. Where deemed appropriate, the reference numerals or the end portions of the reference numerals are repeated among the drawings to indicate corresponding or similar elements optionally having similar characteristics or the same features, unless specified or obvious otherwise.

Various operations and methods have been described. Some methods have been described by way of flow chart in a relatively basic manner, but these operations can optionally be added to and/or removed from these methods. In addition, although the flowchart shows specific sequences of operations according to various exemplary embodiments, it is to be understood that the specific sequences are exemplary. Alternative embodiments may optionally perform these operations in different ways, combine certain operations, interlace some operations, etc. The modules, features, and specific optional details of the devices described herein may also optionally be applied to the methods described herein. In various embodiments, these methods may be executed by and/or executed within such devices.

In the present disclosure, respective functional parts/units/sub-units/modules/sub-modules/means may be hardware. For example, the hardware may be a circuit, including a digital circuit, an analog circuit, and the like. Physical implementation of hardware structures include, but is not limited to, physical devices, and the physical devices include but not are limited to transistors, memristors, and the like. The operation module in the operation device may be any suitable hardware processor such as a CPU, GPU, FPGA, DSP, ASIC, etc. The storage unit may be any suitable magnetic storage medium or magneto-optical storage medium such as RRAM, DRAM, SRAM, EDRAM, HBM, HMC, etc.

Persons skilled in the art can clearly understand that for convenience and conciseness of description, the division of the above-mentioned functional modules is illustrated only as examples, and in practical application, the above-mentioned functions can be assigned to different functional modules to complete according to the needs. That is, the internal structure of the device can be divided into different functional modules to complete all or a part of the functions described above.

The specific embodiments described above further explain the purpose, technical solution and advantageous effects of the present disclosure in detail. It should be understood that the above description only relates to specific embodiments of the present disclosure and is not intended to limit the present disclosure, and any modifications, equivalent substitutions, improvements, etc. made within the spirit and principles of the present disclosure should all be included within the scope of protection of the present disclosure.

What is claimed is:

1. A processing device with dynamically configurable operation bit width, comprising:
    a memory for storing data, the data comprising data to be operated, intermediate operation result, final operation result, and data to be buffered of a neural network;
    a data width adjustment circuit for adjusting the width of the data to be operated, the intermediate operation result, the final operation result, and/or the data to be buffered;
    an operation circuit for operating the data to be operated of the neural network; and
    a control circuit for controlling the memory, the data width adjustment circuit, and the operation circuit, and
    wherein the memory comprises:
        an input storage circuit, configured to store the data to be operated in the neural network;
        an output storage circuit, configured to store the intermediate operation result and the final operation result; and
        a buffer circuit, configured to buffer the data;
        wherein the input storage circuit comprises:
            a neuron storage circuit, configured to store neuron parameters; and
            a synaptic storage circuit, configured to store synaptic parameters;
        the output storage circuit comprises:
            an intermediate operation result storage sub-circuit, configured to store the intermediate operation result; and
            a final operation result storage sub-circuit, configured to store the final operation result.

2. The device according to claim 1, wherein the operation circuit operating the data to be operated of the neural network comprises determining a type of a multiplier circuit and an adder circuit of the operation circuit according to the data to be operated so as to perform the operation.

3. The device according to claim 1, wherein the data width adjustment circuit comprises:
an input data processing circuit, configured to adjust the data width of the data in the memory; and
an output data processing circuit, configured to perform width adjustment on the data operated by the operation circuit and store the width-adjusted data in the memory.

4. The device according to claim 3, wherein the operation circuit comprises a plurality of operation circuits, the synaptic storage circuit comprises a plurality of the synaptic storage sub-circuits, and each of the operation circuits is correspondingly connected to one or more of the synaptic storage sub-circuits, respectively.

5. The device according to claim 4, wherein the operation circuit comprises:
a first operation circuit for performing operation of data of different bit widths; wherein the first operation circuit comprises an adder circuit and a multiplier to perform operation of data of different bit widths in the neural network.

6. The device according to claim 5, wherein the first operation circuit further comprises a bit serial addition tree, the tree includes a shifter, a register, and a plurality of adders, each adder including an a terminal and a b terminal, wherein the bit serial addition tree includes an x+1 layered structure, x is a positive integer, and the bit serial addition tree is configured to operate as follows:
a carry-in output terminal $C_{in}$ in the respective register and the respective adders is initialized to zero; the lowest n bits of each data to be operated are respectively input to the a and b terminals of the adders of a first layer, and each adder of the first layer completes the addition of the lowest n bits of the data to be operated which is input to the a and b terminals, and an obtained result value s is transmitted to the a or b terminals of adders of a next layer, a carry-in value $C_{out}$ obtained by each of the adders in the first layer is transmitted back to the carry-in input $C_{in}$ of the adders in the first layer, to undergo addition with transmitted-in data to be operated in a next cycle;
with reference to the adders of a previous layer, the adders of the next layer work to perform addition on the transmitted-in data, then a result is transmitted to the next layer, and a carry is transmitted back to the present layer, until the $x^{th}$ layer is reached; an adder of the $x^{th}$ layer shifts an operation result by the shifter and adds the shifted operation result with an original result transmitted from the register, and saves the added result back in the register; then, the next lowest n bits of the data to be operated are transmitted to the bit serial addition tree to accomplish corresponding operation upon the next cycle.

7. The device according to claim 2, wherein the multiplier comprises a bit serial operator which comprises at least one of the following:
a basic multiplier for performing an operation by dividing a multiplier into a plurality of low bit width data and multiplying the respective low bit width data with a multiplicand and then accumulating the products;
a sparse multiplier for performing multiplication operation in a circumstance where a multiplier and/or a multiplicand is represented in a sparse manner; and
a fused vector multiplier for performing multiplication operation between vectors.

8. The device according to claim 7, wherein the bit serial operator comprises an operation means, a processing means, and a storage means, wherein the operation means to which data to be operated is input, performs multiplication and/or addition of one or more bits of data, and outputs an operation result;
the storage means stores the input operation result to the storage means;
the processing means to which the operation result is input, performs data shifting, expands/decreases bit width of the data according to a set rule, and/or processes one or more bits of the data according to a certain set rule.

9. The device according to claim 7, wherein the basic multiplier is a first basic multiplier, comprising:
a multiplication storage circuit for storing a multiplier, of which the bit width is N bits;
a first shift register for shifting out the lower n bits of the multiplier each time, and the multiplier after undergoing the shifting operation is re-sent into the multiplication storage circuit, wherein $1 < n \le N$;
an input selection circuit to which the multiplicand and the lower n bits of the multiplier are input each time, and AND operation is performed between a value of each of the lower n bits of the multiplier and the multiplicand respectively to obtain an AND operation result;
a second shift register for inputting the AND operation result and performing shift;
an adder for inputting the shifted data for addition; and
a result register for registering an addition result of the adder and re-inputting the addition result to the adder for a next addition.

10. The device according to claim 7, wherein the basic multiplier is a second basic multiplier, comprising:
a multiplication storage circuit for storing a multiplier, of which the bit width is N bits;
a first shift register for shifting out the lower n bits of the multiplier each time, and the multiplier after undergoing the shifting operation is re-sent into the multiplication storage circuit, wherein $1 < n \le N$;
a backup register for temporarily storing the shifted multiplier;
an input selection circuit to which the multiplicand and the lower n bits of the multiplier are input each time, and AND operation is performed between a value of each of the lower n bits of the multiplier and the multiplicand respectively to obtain an AND operation result;
a second shift register for inputting the AND operation result and performing shift;
a third shift register for shifting the multiplicand and removing lower m bits of the multiplier;
an adder for inputting the shifted data for addition; and
a result register for registering an addition result of the adder and re-inputting the addition result to the adder for a next addition.

11. The device according to claim 10, wherein the first basic multiplier or the second basic multiplier further comprises a determination circuit for determining whether all of present multiplier values in the multiplication storage circuit are 0.

12. The device according to claim 6, wherein the sparse multiplier comprises:
a multiplication storage circuit for storing a multiplier which is expressed in a sparse manner and has a bit width of N bits;
an input selection circuit for selecting a bit of the multiplier with the value of 1 from the lower bit each time;

a first shift register for each time shifting out each lower bit of the bit with the value of 1 and re-sending the each lower bit to the multiplication storage circuit as a multiplier for next time;

a second shift register for performing a shift operation according to the bit with the value of 1;

an adder for inputting the shifted data and adding the shifted data;

a result register for registering an addition result of the adder;

a third shift register for shifting a result in the result register according to the bit with the value of 1, and then re-inputting the shifted result into the adder, to be operated for the next time; and a determination circuit for determining whether all values of a present multiplier in the multiplication storage circuit are 0.

13. The device according to claim 12, wherein operation of the data includes: dot product, inter-matrix multiplication, addition, multiplication and addition; multiplication, addition, multiplication and addition of matrix and vector; multiplication, addition, multiplication and addition of matrix and constant; multiplication, addition, multiplication and addition between vectors; multiplication, addition, multiplication and addition of vector and constant; multiplication, addition, multiplication and addition of constant and constant; comparison and selection of a maximum/minimum value, and operations that are dividable into multiplication, addition, or multiplication and addition.

14. The device according to claim 7, wherein the multiplier and the addition tree are executed in parallel in a pipelined manner.

15. The device according to claim 10, wherein the first operation circuit comprises a second basic multiplier and a bit serial addition tree, the first operation circuit performs operation in the following manner:

it is assumed that an inner product value of the vectors $\vec{A}\{A_N \ldots A_2 A_1 A_0\}$ and $\vec{B}\{B_N \ldots B_2 B_1 B_0\}$ is to be calculated, wherein the dimensions of $\vec{A}$ and $\vec{B}$ are the same, both being (N+1), A is a multiplicand and B is a multiplier, in each operation, specified m bits of A are taken and specified n bits of B are taken to undergo operation, wherein m is a positive integer not larger than the bit width of one dimension of $\vec{A}$, and n is a positive integer not larger than the bit width of one dimension of $\vec{B}$;

the lower m bits of $A_0$ and the lower n bits of $B_0$ are taken and multiplied in the multiplier, an obtained result of a selection is sent to the bit serial addition tree for addition, and a result of the addition is stored in a storage circuit;

B is shifted by n bits and multiplied with the lower m bits of A, and a result is sent to the bit serial addition tree for addition together with the original data in the storage circuit after undergoing shifting by the third shift circuit, and a result of the addition is stored in the storage circuit;

after the operation of all of B is completed, A is shifted by m bits and the shifted A undergoes operation again with the n bits of B in turn;

when all operations end, the data in the storage circuit then is the solicited final operation result.

16. A method, comprising steps of:

generating, by the control circuit, a control instruction, and transmitting the control instruction to a memory, a data width adjustment circuit, and an operation circuit;

inputting, by the memory, data to be operated in a neural network into the operation circuit according to the received control instruction;

adjusting, by the data width adjustment circuit, a width of the data to be operated in the neural network according to the received control instruction; and performing, by the operation circuit, operation of the data to be operated in the neural network with different operation bit widths according to the input data to be operated and parameters of the neural network as well as the control instruction, and sending the operation result back to the memory, wherein the memory comprises:

an input storage circuit, configured to store the data to be operated in the neural network;

an output storage circuit, configured to store the intermediate operation result and the final operation result; and a buffer circuit, configured to buffer the data;

wherein the input storage circuit comprises:

a neuron storage circuit for storing neuron parameters; and a synaptic storage circuit for storing synaptic parameters;

the output storage circuit comprises:

an intermediate operation result storage sub-circuit for storing the intermediate operation result; and a final operation result storage sub-circuit for storing the final operation result.

17. The method according to claim 16, wherein the data width adjustment circuit comprises an input data processing circuit configured to adjust the data width of the data in the memory, and an output data processing circuit configured to perform width adjustment on the data operated by the operation circuit and store the adjusted data in the memory.

18. The method according to claim 17, wherein the adjusting the width of the data to be operated in the neural network comprises at least one of the following ways:

increasing, decreasing or maintaining the bit width of the data without loss of precision;

increasing, decreasing or maintaining the bit width of the data in the case where the loss of precision can be set; and increasing, decreasing or maintaining the bit width of the data according to specified transformation or operation requirement.

19. The method according to claim 16, further comprising providing a plurality of operation circuits which respectively correspond to one or more of the synaptic storage circuit; wherein during the operation, the input storage circuit transmits input data to all the operation circuits, the synaptic storage circuit transmits synapse data to the corresponding operation circuit, and the operation circuit performs operations and writes a result to the output storage circuit.

20. The method according to claim 19, further comprising:

performing operation of data of different bit widths by a first operation circuit, including: accelerating the operation of data of different bit widths in the neural network by using an adder and a multiplier.

21. The method according to claim 20, wherein the operation of the data to be operated in the neural network with different bit widths includes operation of data of different bit widths by using a bit serial addition tree, the operation manner being as follows:

assuming that there are M data to be operated, of which the maximum bit width is N, wherein M and N both are positive integers; for data with less than N bits, the number of bits thereof is supplemented to N bits; the bit serial addition tree includes x+1 layers, wherein x is a positive integer; adders in the first layer to the $x^{th}$ layer perform the addition of n bits of the data, n≥1, and the adders in the $(x+1)^{th}$ layer complete addition of data of not less than N bits; firstly, a carry-in output terminal $C_{in}$ in the register and respective adders is initialized to zero, and the lowest n bits of each data to be operated are respectively input to a and b terminals of the adders of the first layer, and each adder completes the addition of the lowest n bits of the data to be operated which are input from the a and b terminals, and an obtained result value s is transmitted to a or b terminals of adders of a next layer, a carry-in value $C_{out}$ obtained by each of the adders in the first layer is transmitted back to the carry-in input $C_{in}$ of the adders in the first layer, to undergo addition with the transmitted-in data to be operated in the next cycle;

the operation of the adders of the next layer is similar as below, the transmitted-in data is added, and then the result is transmitted to the next layer, and a carry is transmitted back to the present layer, until the $x^{th}$ layer is reached; an adder of the $x^{th}$ layer shifts an operation result and adds the shifted operation result with an original result transmitted from the register, and saves the added result back in the register; then, the next lowest n bits of the data to be operated are transmitted to the bit serial addition tree to accomplish corresponding operation.

22. The method according to claim 21, wherein the operation of data of different bit widths by using a bit serial addition tree further comprises inputting a second batch of n-bit data to be operated after the operation of the adders of the first layer is completed.

23. The method according to claim 20, wherein the operation of data of different bit widths by using a bit serial addition tree further comprises turning off the adder during the operation in a circumstance where a, b terminals of the data to be operated input to the adder and the carry-in input Cin are all 0.

24. The method according to claim 16, wherein the operation of the data to be operated in the neural network with different operation bit widths comprises performing operation by using a bit serial operator, which comprises the following operations:

by using an operation means, inputting the data to be operated, and completing multiplication and/or addition of one or more bits of data, and outputting an operation result;

by using a storage means, inputting the operation result for storage; and by using a processing means, inputting the operation result, and performing data shifting, expanding/decreasing bit width of the data according to a set rule, and/or processing one or more bits of the data according to a certain set rule.

25. The method according to claim 16, wherein the operation of the data to be operated in the neural network with different operation bit widths comprises performing operation of data of different bit widths by using a first basic multiplier, which comprises the following operations:

by using a multiplication storage circuit, storing a multiplier of which the bit width is N bits;

by using a first shift register, shifting out the lower n bits of the multiplier each time, and re-sending the multiplier after undergoing the shifting operation into the multiplication storage circuit, wherein 1<n≤N;

by using an input selection circuit, inputting a lower n bits of the multiplier and a multiplicand each time, performing AND operation on the value of each of the lower n bits of the multiplier with the multiplicand to obtain an AND operation result;

by using a second shift register, inputting the AND operation result and performing shift;

by using an adder, inputting the shifted data for addition; and by using a result register, registering the addition result of the adder and re-inputting the addition result to the adder for the next addition.

26. The method according to claim 16, wherein the operation of the data to be operated in the neural network with different operation bit widths comprises: performing operation of data of different bit widths by using a second basic multiplier, which comprises the following operations:

by using a multiplication storage circuit, storing a multiplier, of which the bit width is N bits;

by using a first shift register, shifting out the lower n bits of the multiplier each time, and re-sending the multiplier after undergoing the shifting operation into the multiplication storage circuit, wherein 1<n≤N;

by using a backup register, temporarily storing the shifted multiplier;

by using an input selection circuit, inputting a multiplicand and the lower n bits of the multiplier each time, and performing AND operation on the value of each of the lower n bits of the multiplier with the multiplicand to obtain an AND operation result;

by using a second shift register, inputting the AND operation result and performing shift;

by using a third shift register, shifting the multiplicand and removing the lower m bits of the multiplicand;

by using an adder, inputting the shifted data for addition; and by using a result register, registering an addition result of the adder and re-inputting the addition result to the adder for the next addition.

27. The method according to claim 16, wherein the operation of the data to be operated in the neural network with different operation bit widths comprises performing operation of data of different bit widths by using a sparse multiplier, which comprises the following operations:

by using a multiplication storage circuit, storing a multiplier which is expressed in a sparse manner and has a bit width of N bits;

by using an input selection circuit, selecting a bit of the multiplier with a value of 1 from lower bit each time;

by using a first shift register, each time shifting out each lower bit of the bit with the value of 1 and re-sending each lower bit to the multiplication storage circuit as a multiplier for next time;

by using a second shift register, performing a shift operation according to the bit with the value of 1;

by using an adder, inputting the shifted data and adding the shifted data;

by using a result register, registering an addition result of the adder; and by using a third shift register, shifting a result in the result register according to the bit with the value of 1, and then re-inputting the shifted result into the adder, to be operated for the next time.

28. The method according to claim 16, wherein the operation of the data to be operated in the neural network with different operation bit widths comprises operation according to the following manner by using a second basic multiplier and a bit serial addition tree:

it is assumed that an inner product value of the vectors $\vec{A}\{A_N \ldots A_2 A_1 A_0\}$ and $\vec{B}\{B_N \ldots B_2 B_1 B_0\}$ is to be calculated, wherein the dimensions of A and B are the same, both being (N+1), A is a multiplicand and B is a multiplier, in each operation, specified m bits of A are taken and specified n bits of B are taken to undergo operation, wherein m is a positive integer not larger than the bit width of one dimension of $\vec{A}$, and n is a positive integer not larger than the bit width of one dimension of $\vec{B}$;

the lower m bits of $A_0$ and the lower n bits of $B_0$ are taken and multiplied in the multiplier, and the obtained result of a selection is sent to the bit serial addition tree for addition, and a result of the addition is stored in a storage circuit;

B is shifted by n bits and multiplied with the lower m bits of A, and the result is sent to the bit serial addition tree for addition together with the original data in the storage circuit after undergoing shifting by the third shift circuit, and a result of the addition is stored in the storage circuit;

after the operation of all of B is completed, A is shifted by m bits and the shifted A undergoes operation with the n bits of B in turn; and when all operations end, the data in the storage circuit then is the solicited final operation result.

29. The method according to claim 28, wherein the operation of the data to be operated in the neural network with different operation bit widths comprises: performing operation on fully connected layer and/or pooling layer by the operation circuit.

30. The method according to claim 16, further comprising: by the operation circuit, selecting a multiplier circuit and an adder circuit of a corresponding type in the first operation circuit according to the received control instruction.

* * * * *